United States Patent Office 3,411,388
Patented Nov. 19, 1968

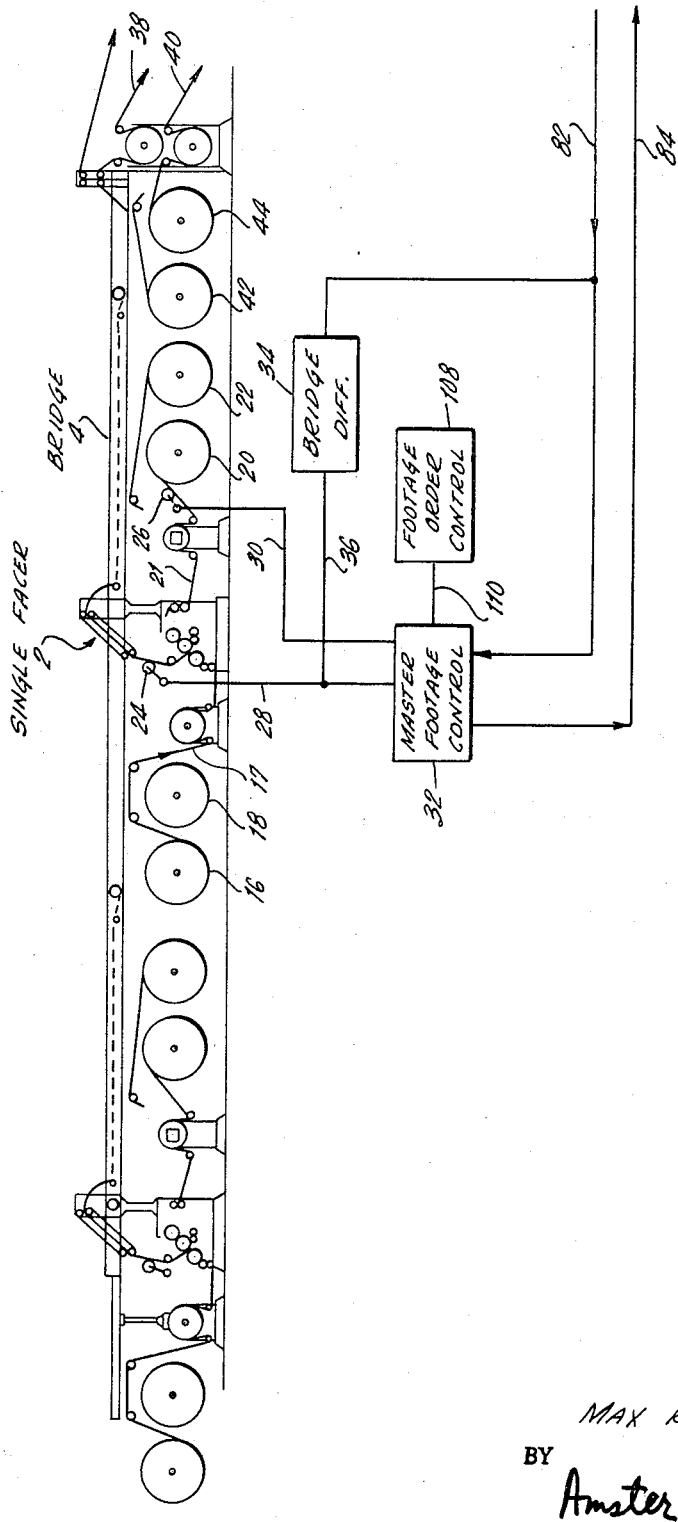

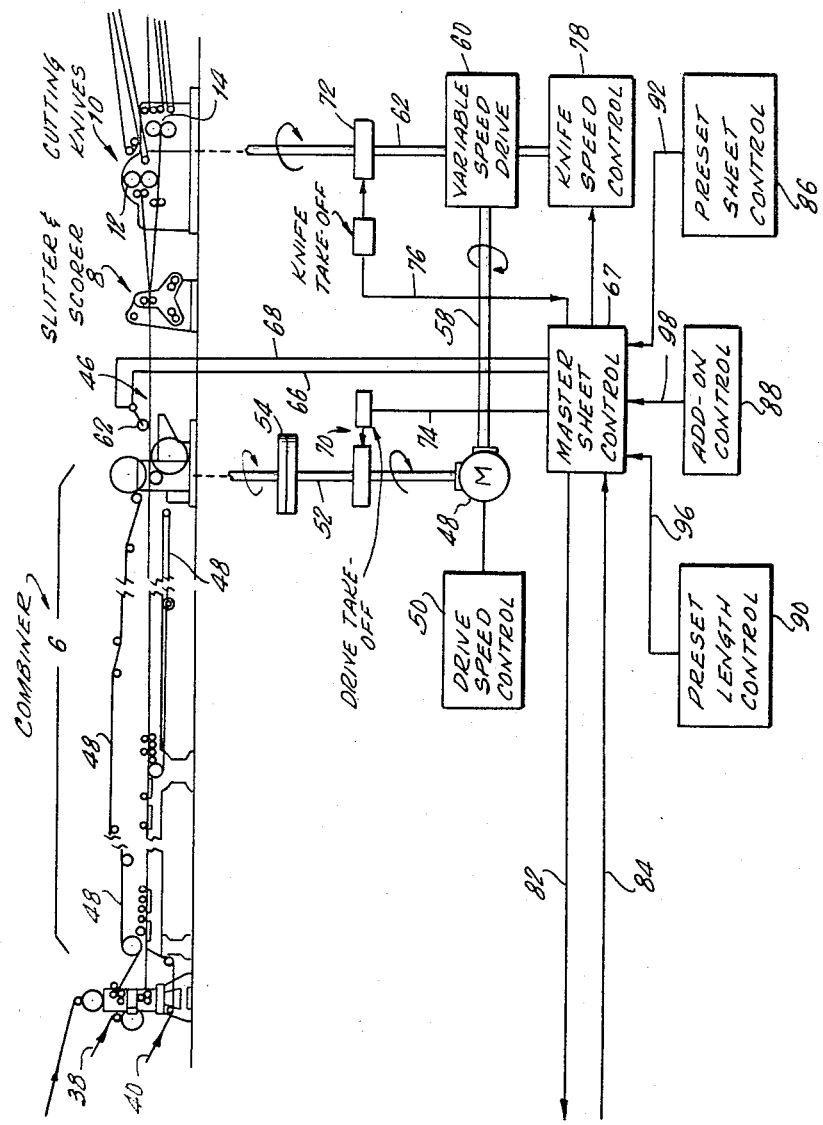

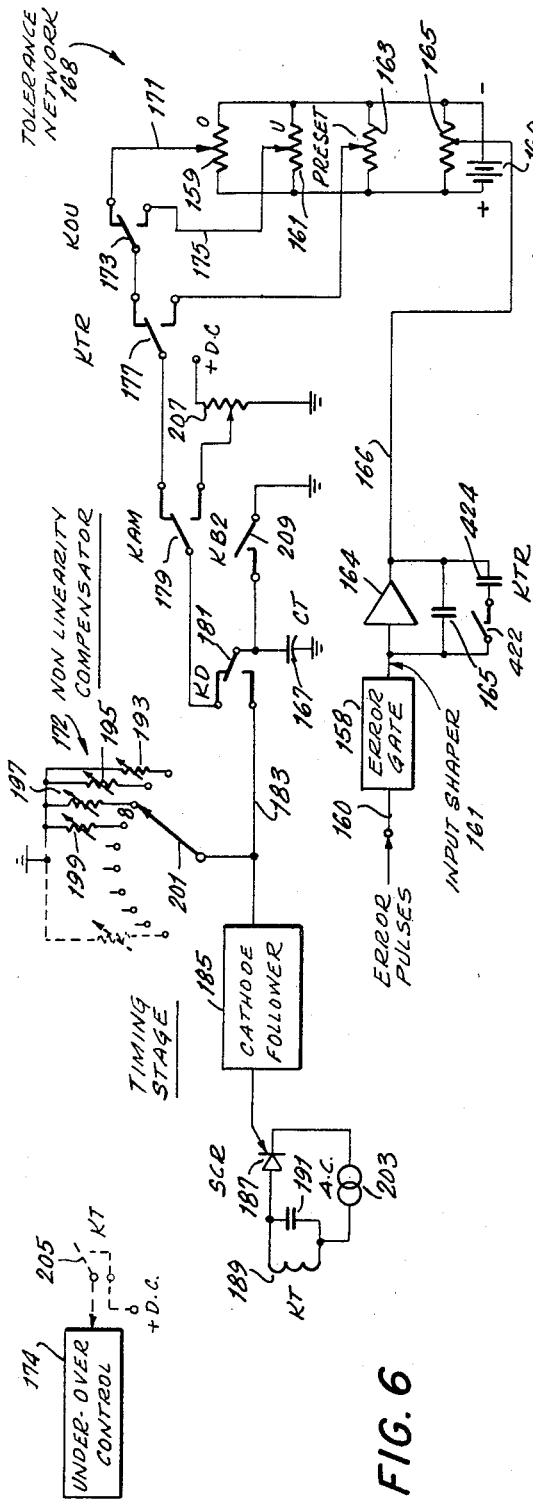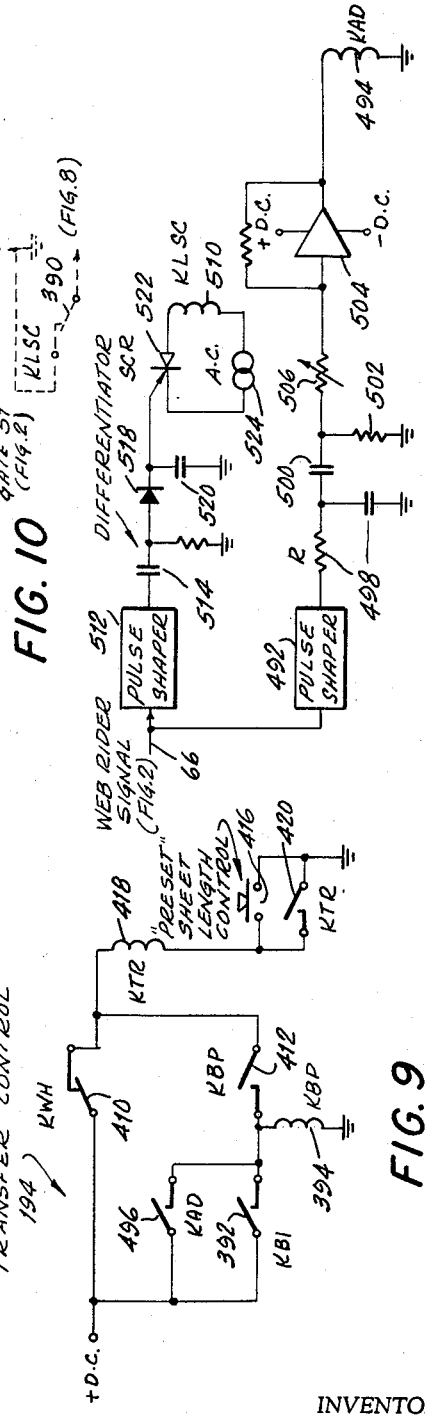

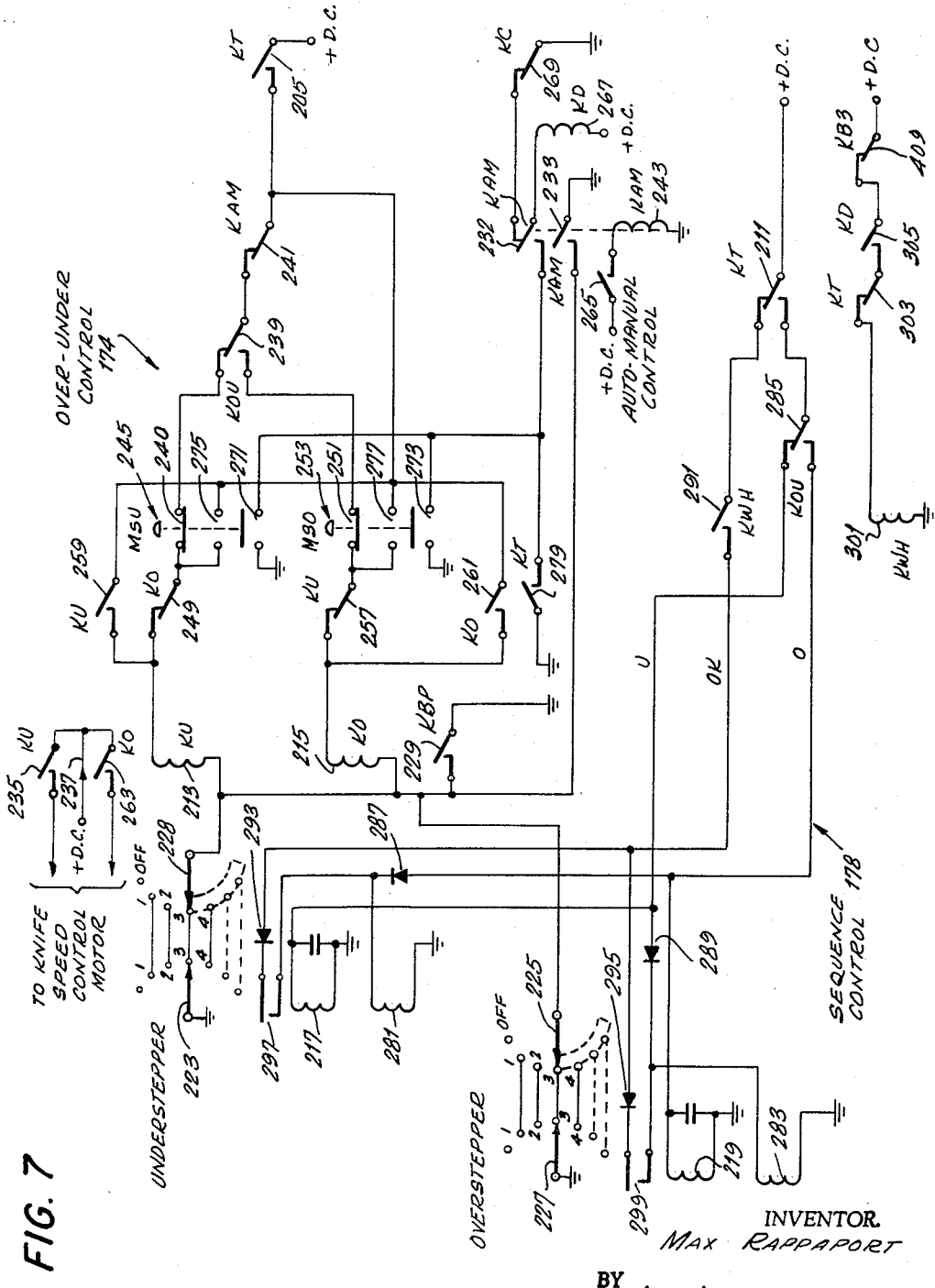

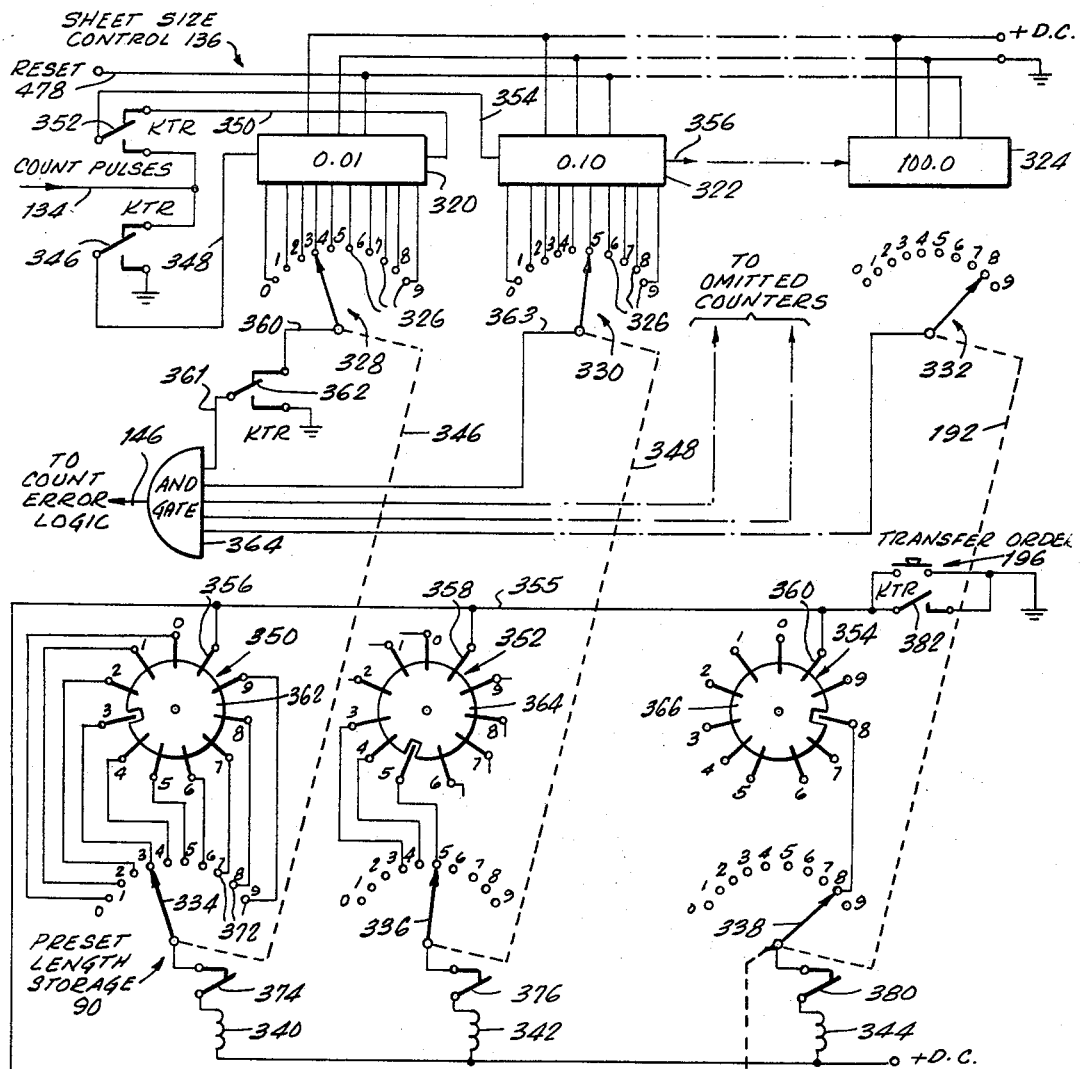
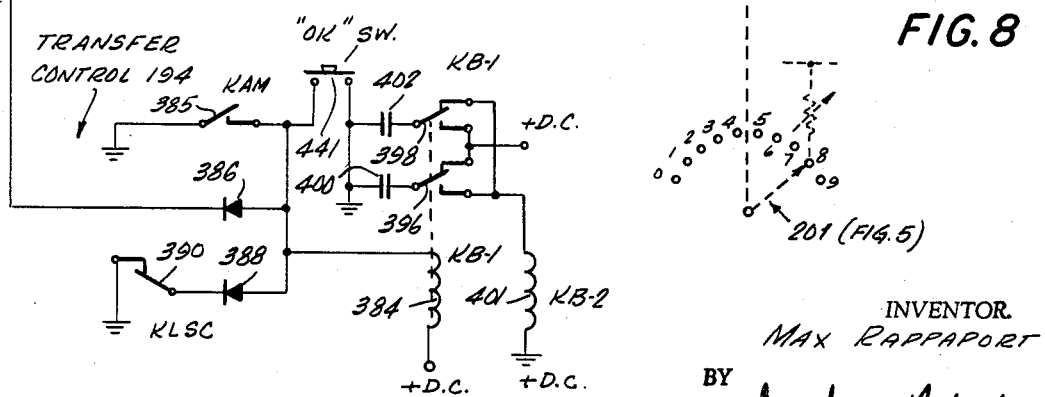
FIG. 8
INVENTOR.
MAX RAPPAPORT
BY Amster & Rothstein
ATTORNEYS

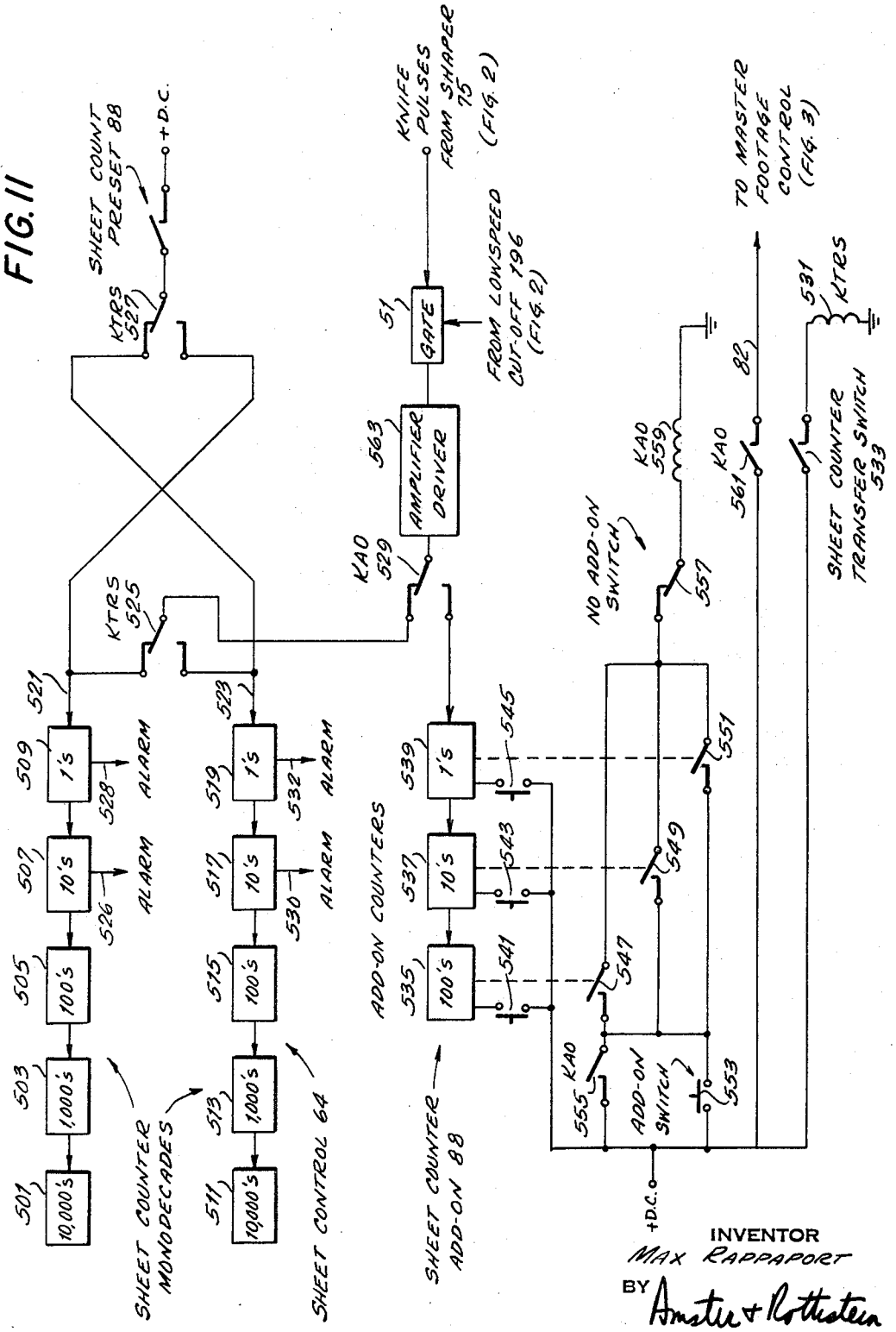

3,411,388
INTEGRATED SHEET PRODUCTION CONTROL SYSTEM
Max Rappaport, River Edge, N.J., assignor, by mesne assignments, to Cutler-Hammer, Inc., Milwaukee, Wis., a corporation of Delaware
Filed Jan. 11, 1965, Ser. No. 424,685
13 Claims. (Cl. 83—76)

ABSTRACT OF THE DISCLOSURE

An integrated system of sheet length and number order control, automatic cut-off knife speed control, and production footage requirement and storage indication to aid in the production of webs of cardboard or corrugated boxboard and afford cut-off of the web into desired numbers and lengths of individual sheets. A master sheet control is presettable for at least two successive production runs to direct the number and length of sheets to be produced. A digital pulse type cut-off knife speed control automatically functions under the direction of the master sheet control to hold the length of cut sheets within a predetermined tolerance range. The knife speed control corrects for errors in sheet length only when a sequential error trend is noticed, and does not afford corrected action when the desired preset length is changed. Automatic compensation for knife speed non-linearity is also incorporated. A master footage control responding to signals from the master sheet control presettings, a footage order control and from a rider on material entering an initial production station affords indication at any time during a production run of the footage of web material required to complete a production run of cut sheets. Continuous indication of the amount of partially completed web stored at an intermediate point is also provided.

---

This invention relates to machines for cutting fed material into lengths and to improved means for controlling these lengths. More specifically the invention relates to new and improved means for controlling the speed of fabrication of a continuous flow of fed material and relating the flow to the rate of consumption of material in a controlled cutting operation.

While the invention has broad utility in the control and production of sheet materials of many kinds, it will be described here as applied to the fabrication of sheets of cardboard of precisely controlled length and width suitable for use in box making, including the following operations: The feeding of strips of paper medium and liner to a single facer which produces a continuous flow of transversely fluted paper glued on one side to a sheet of facing paper; storing a varying amount of the single face so produced in a bridge or dwell area; the withdrawal of single face from the bridge, and the combination of it with a second paper facing on its opposite face, to produce the web; the feeding of the web from the combiner to a cutter or knife for cutting off sheet cardboard in the desired lengths. In such operations close control over each stage of the operation is desired so as to insure minimum accumulative waste of feed stock, intermediate web stock, and finished sheet; but effective production control has been unavailable in an operation where frequent changes (as many as one hundred per day) in the operating set up are necessitated by the short run nature of customer requirements.

In the description which follows, the invention will be described as applied to the production of sheet cardboard having facing on each side of a single layer of fluted paper such as may be produced by the operation of one single facer, one bridge, a combiner, a slitter and a single knife, it being understood that more units may be included and controlled by expansion of the control facilities of the invention as needed. Further, the invention relates to, and will be described in, its application to the type of combiner operation wherein the combiner is driven by a variable speed motor, and a variable speed transmission is interposed between the combiner drive and the drive to the cutting knives, thereby providing separate control of speeds of web and cutting knife. In such set-ups, the variable speed knife drive is ordinarily of the "Reeves" type so as to provide continuously variable speed control over a wide range while transmitting the necessarily large amount of horsepower required to drive the cutting knives. Inherently, these variable speed drives are not precise in either their ability to be reset to a given speed, nor can they maintain the set speed precisely. Also, the speed of the web as it leaves the combiner is subject to variation because of slippage. All these speed errors produce changes in the relative speeds of the web and the knife and produce larger errors in length of the final cut sheets. Customer requirements are frequently quite stringent, requiring sheet length control to within a quarter of an inch, or less, and the random nature of the variations in speed, just described, produce overlength and underlength sheets in a significant quantity when considered over the production year.

It is an object of this invention to provide a sheet control system capable of precise control of sheet length to a tenth of an inch or less, regardless of the length of the sheet produced. While the relative of speeds of operation of the combiner and the cutting knives must be quite precisely controlled, such precise control of the speeds of operations feeding the combiner is not required, so long as a sufficient feed reserve is established. Thus, the operation of each single facer must, from time to time, be interrupted to permit splicing, or its speed may be changed to accommodate differences in curing temperature, glue composition, etc. Conventionally, then, the output of the single facer fed to a bridge where the material is allowed to accumulate and to dwell until demanded by the combiner feed rolls. Because of the large distance separating the cutting knives and the combiner from the most distant single facer operator, which may be as much as 100 ft., coordination between the various operators of the production stands has been crude, and subject to error since hand signals are commonly employed. Because of the crudeness of these communications, much waste occurs due to over-anticipation of the amount of materials required to complete any given order. In addition, the single facer operator, having only a rough idea of the amount of material stored in the bridge, is unable to anticipate accurately the amount of material required to finish an order. Finally, while the single facer operator may know how much material he has produced, he does not know how much material has been wasted for various reasons in the total operation. He must, therefore, overproduce feed material by an unknown amount.

It is a further object of this invention to provide overall production control means for substantially reducing waste by relating consumption at the knives to production at the single facers, taking into account all material in process, while permitting continuous adjustment to allow for the additional material needed to offset waste noted at the cutter. Such waste may include defective board resulting from splices in the feed, from defective gluing, or from short sheets at the knife.

It is an object of the invention, therefore, to provide means for making running adjustments of the cutter operator's sheet counter while, simultaneously, supplying the single facer operator with connected demand information for regulating single facer output.

It is characteristic of the corrugated sheet production that frequent set-up changes must be made during the day because of the short run nature of most customer requirements. Thus, the day's scheduling will dictate changes in facing and medium to yield webs of differing character, changes in slitter and scorer settings, and changes in the cutting knife speeds in order to produce different sheet sizes. The length of run must also be determined, as well as the approximate material input. In a given day, there may be as many as sixty interruptions for such changes. These interruptions represent time wasted as well as material wasted since, for example, starting production under the new conditions requires, first, adjustment by hand of knife speed to produce the desired sheet length, a process which necessarily produces many sheets of incorrect length, and then, as production is accelerated, further readjustments, accompanied by more waste.

It is an object of this invention to provide automatic means for adjusting the knife speeds so that production of sheets of the required length is almost coincidental with start-up, resulting in waste of only one or two finished sheets for incorrect length.

It is another object of the invention to provide means for storing preset knife orders, and for transferring them to the knife speed control automatically upon the completion of a predetermined number of sheets.

Another feature of the invention permits setting up knife speed without the web or board running so that sheet length may be controlled to less than an inch on the first cut. Another feature of the invention is elimination of the need for the continuous-running jogging control for operator adjustment of the sheet length during the run, as well as eliminating the need for guessing by the operator as to how long the jogging button should be activated.

Still another object of the invention is the elimination of wear, tear, and overheating of the knife drive speed control motors due to excessive energizing for minor corrections.

Another object of the invention is the provision of a knife speed control system in which changes may be made from short sheet lengths to sheet lengths equal to or greater than double the previously set sheet length without the system locking into the shorter sheet length.

The above objects and others which will become apparent from the following description of the invention are attained by interrelated, coordinated operation of a sheet length control and a master footage control. The sheet length control includes means for generating a train of pulses whose frequency is proportional to the speed of the web and a train of pulses whose frequency is proportional to the speed of the knife, logic means for comparing the two trains to generate an error signal indicating whether a sheet is shorter or longer than an ordered length, and means for generating an error signal proportional to the error in length. The error signal is corrected for tolerance so that corrections are not made when the sheet production is running within specified tolerances, and the timing of application of the error signal to the speed correction apparatus is modified to compensate for nonlinearity of response of the knife speed control to the knife speed control correction mechanism. Means are also provided for detecting a trend in the sequence of error signals as they are successively generated and for preventing correction of the knife speed until, for example, several like corrections are required.

Included in the knife speed control are automatic means for changing the ordered sheet length in small or large degree, and for suppressing operation of the sequencer where there is a change in the ordered length or where production speeds are changed. Means are also provided for resetting the logic and erasing partially completed length measuring operations when changes in the operating mode are ordered. During such changes, length comparisons are prevented or, if started, are erased with false measurements being avoided.

Driven by the sheet length control is a master sheet counter which may be set to a predetermined count and which counts down to zero for the completion of an order; new count orders may be established in advance, and transferred into the counter upon command, and means are provided for automatically adding to the count of sheets to be produced to correct for sheets noted as wasted at the knife. A master footage control receives count information from the master sheet counter, and having been set in advance of the start of a run, indicates to the single-facer operator the amount of footage which must be produced in order to complete an order. When the knife operator changes the sheet count ordered, the footage demand is proportionately altered automatically at the master footage control. A differential footage control is provided for indicating the amount of postage produced by the single facer and stored in the associated bridge. End of ordered footage production is signalled to the knife control operator automatically so that he may "add on" any necessary changes in footage to compensate for waste noted at the knife.

In the drawings:

FIGS. 1 and 1a illustrate the invention as employed in the production of double faced, single fluted cardboard. A side view of the equipment with a block diagram is used.

FIG. 6 is a schematic diagram of the operational amplifier, tolerance network, and timing stage portions of FIG. 2.

FIG. 7 is a schematic diagram of the under-over and sequence control portions of FIG. 2.

FIG. 8 is a schematic diagram of the sheet size control, transfer order control, preset storage and transfer control portions of FIG. 2.

FIG. 9 is a schematic diagram of another part of the transfer control along with the "preset" sheet length control of FIG. 2.

FIG. 10 is a schematic diagram of the acceleration-deceleration and low speed cut-off controls of FIG. 2, and FIG. 11 is a schematic diagram with certain details of the master sheet, sheet count preset and sheet counter add-on controls of FIG. 2.

Figure 2:
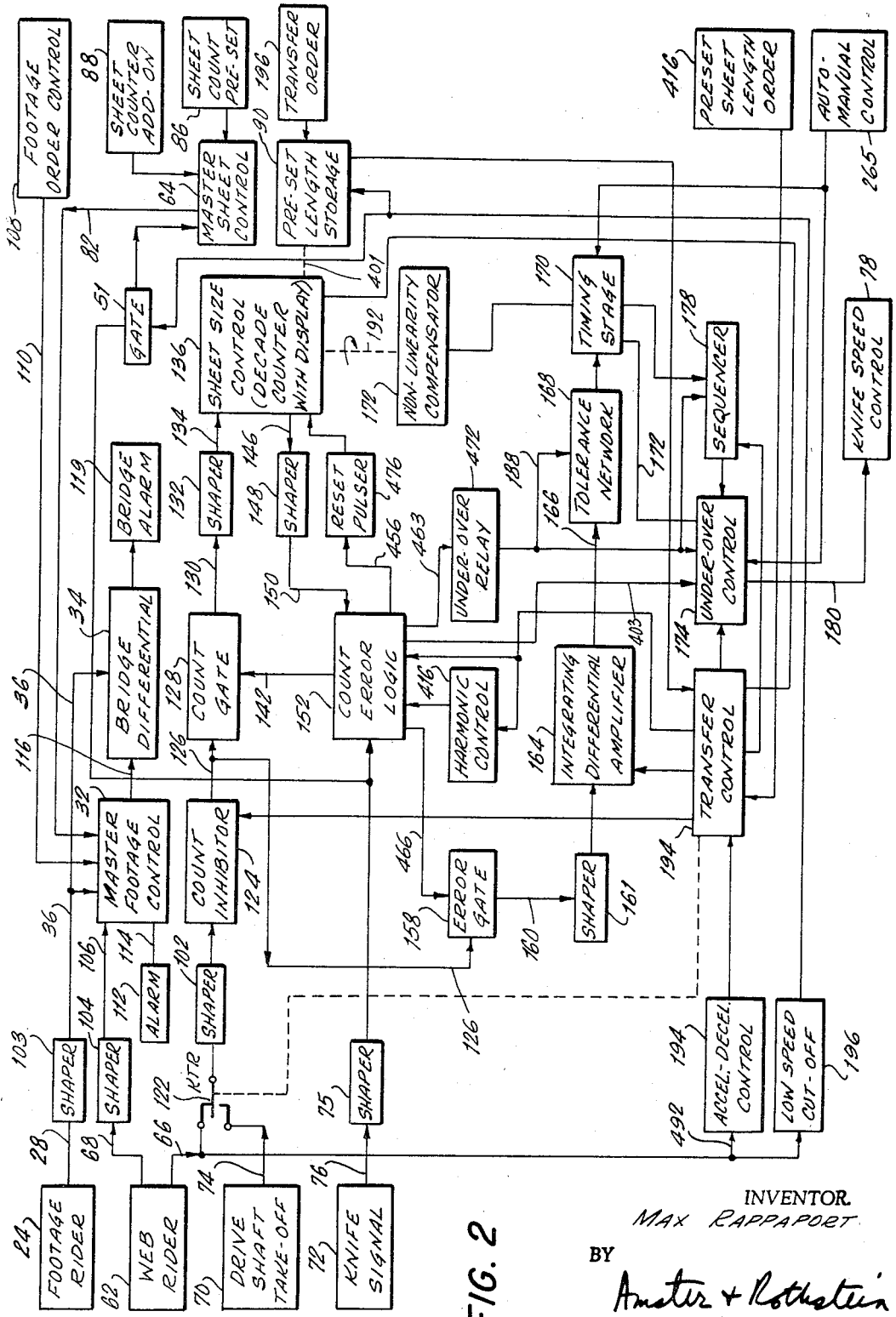
FIG. 2 is a block diagram showing the interrelationship between the control units of FIG. 1 in greater detail.

Reference is now made of FIGS. 1 and 1a in which a production system for making corrugated sheet cardboard according to the teachings of the invention is shown. The production equipment proper includes of the following major units: Single facer 2, bridge 4, combiner 6, slitter and scorer 8, and cutter 10, having two sets of cutting knives 12 and 14. It will be understood by those skilled in the art that more than one single facer may be used. Single facer 2 has facing material feed rolls 16 and 18, from either one of which, at the will of the operator, facing material can be drawn for pre-heating and gluing in single facer 2. Single facer 2 also draws a supply of medium from feed roll 20 or 22, corrugates, or flutes, the medium and presses it to the gluey surface of the facing paper. The laminate "single-face" so produced is fed into bridge 4 where it is allowed to accumulate until withdrawn and pre-heated for feeding into combiner 6. Footage riders 24 and 26 meter the consumption of facer and medium, respectively, each by means of a roller riding on the surface of the material. Roller driven pulse generators provide electrical pulses at the rate of one for every 0.1 inch of paper movement, and may be, for example, of the induction or variable reluctance type known in the art. Signals from footage riders 24 and 26 are fed by means of lines 28 and 30, respectively, to master footage control 32, wherealong with other readings, display counters show the amount of footage consumed from each roll. A signal from footage rider 24, the facer usage signal, is also supplied to bridge differential unit 34 by means of connecting line 36.

The single faced laminate 38 is withdrawn from bridge 4 at the input to combiner 6, where it is combined with a bottom facing layer 40, the steps of preheating and gluing being repeated, to produce the double faced, conventional form of cardboard, or web 46. Web 46 is then passed onto the curing bed where heat is supplied to set the glues. As before, the operator controls the choice of facing feed from either roll 42 or 44. Feedbelts, 48 which are not illustrated in detail, are used to keep web 46 flat during curing.

Web 46 then passes from combiner 6 into slitter and scorer 8 where longitudinal cuts and/or score marks are made in the web at predetermined locations, establishing the ultimate width of the cardboard sheet to be produced, as well as lines along which it may be folded.

From slitter and scorer 8, the web, which now customarily is in two widths as a result of slitting, is fed to one or the other of two transverse cutting knives 12 or 14 for severence into sheets of predetermined lengths.

As will be seen, the operation of the corrugator is basically an integration of two independent processes: the first process is fluting and laminating of two continuous paper sheets to yield a quantity of single face, and the second process is combining and cutting to produce rectangular sheets or boards. During normal operation these two processes are run at different speeds, being tied together by means of the dwell or bridge area where single face produced ahead of the knives requirements is stored. Thus, the different processing requirements for the single facer, including the allowance of time for splicing feeds at the single facer, demand that speed control of the single-facer operation be maintained independent, to a large degree, of the precisely controlled, interrelated operating speeds of the combiner and cutter. Because speed control of the single facer remains with the operator, and for the sake of simplicity, the drives and speed controls for the single facers are omitted from the drawings.

The drive mechanism for the corrugator of FIG. 1 includes motor 48, provided with drive speed control 50. Motor 48, by means of conventional reduction gearing not shown, provides rotational drive energy through combiner drive shaft 52 and combiner drive clutch 54 to combiner 6. Motor 48 also drives cutting knives 12 and 14, the drive for knives 14 being through drive shaft 58 to variable speed drive 60, whence, in turn, drive shaft 62 supplies rotational energy to one pair of cutting knives 14. Still another shaft and variable speed drive, not shown, is used to drive cutting knives 12. Web rider 62 generates two trains of electrical pulses which are transmitted to master sheet control 67 by means of connecting lines 66 and 68. Web rider 62 may include magnetic impulse generators, magnetically actuated, vacuum reed switches or other well known pulse generators. As was the case with the footage riders, pulses are emitted at a rate proportional to the linear travel of the material being metered; in this case, for reasons stated below, it is desirable to have distinct signals, one course and one fine, reporting the speed of web travel from combiner 6 to cutting knives 10. Drive take-off 70 on combiner drive shaft 52 and knife speed take-off 72 on knife drive shaft 62 provide signals proportional to the speed of angular rotation of combiner drive 52 and of knives 14 respectively.

Master sheet control 64 receives the combiner drive speed signal from take-off 70 through connecting line 74 and from knife take-off 72 through connecting line 76. As will be seen below in detail, master sheet control 64 processes the speed signals from web rider 62 or combiner drive take-off 70, compares them with speed signals from knife take-off 72, and derives an error signal, which if error is found, is proportional to the error in length of the cut sheet just produced. The processed error signal is fed to knife speed control 78 through connecting line 80. Knife speed control 78, which conventionally, may be a reversible motor, alters the ratio between the input and output speeds of shafts 58 and 62 by appropriate adjustment of variable speed drive 60. The knife drive is thus returned to its correct operating speed for production of the desired length of cut sheet. In addition, the knife pulses drive the sheet counter in sheet control 64 (see FIG. 2). Master sheet control 64 also generates an output signal proportional to the footage of webbing consumed which is supplied through connecting lines 82 to master footage control 32 and bridge differential 34. As will be seen below in greater detail, master footage control 32 relates the information received from master sheet control 64 to that received from facing material footage rider 24 and displays, by means of counters, a single facer production demand figure in terms of footage yet to be produced, for use by the single facer operator in anticipating the completion of an order at the knives. Similarly, web footage information fed to bridge differential 34 is combined with information from footage rider 24 to display the numerical amount of single faced footage stored in the bridge. The operator is thus enabled to make an accurate estimate of the total single faced footage requirements remaining.

Master sheet control 64 is also fed with information from preset sheet control 86 and add-on control 88 for purposes of automatically setting in new total sheet count orders or of modifying the sheet count already ordered, respectively. Preset control 86 thus enables rapid transfer of new sheet count information from storage into the master sheet control upon completion of an order being processed, and add-on control 88 enables the knife operator to increase the number of sheets being counted by the master sheet control to offset production lost due to production of faulty boards. Finally, preset length control 90 performs the function of storing next order sheet length information for automatic transfer to the master sheet control upon completion of the existing order.

Reference is now made to FIG. 2, which is a block diagram showing greater detail of the functional relationship between various components of the electrical control system employed in the invention. Reference is made, from time to time, to subsequent figures of the drawings for detail of various portions of the control system.

As indicated above, information for use in the control of production by the single facer is developed in master footage control 32. Information from facing material rider 24, in the form of pulses, generated by the passage of each 10 feet of facing material past the rider, thus measuring the actual footage consumed by the single facer in 10 foot increments, is fed to footage control 32. Also pulses generated by web rider 62 at the rate of one pulse per 10 feet are fed through line 68 and shaper 104 to master footage control 32. Shapers 103, 104 are provided for the purpose of correcting the wave shape, as will be understood by those skilled in the art. Master footage control 32, in one form of the invention, contains a pulse counting unit which actuates an associated numerical display. The conuter may conveniently comprise several stepping relay decades in which the counting action is down from 0 through 9, 8, 7, etc., to 1. This type of counter is commercially available in several forms, so it will be understood that, for example an electronic digital counter may be used. It will also be understood that the number of decades required in the counter will be a function of the maximum amount of footage which may be expected to be processed on a given corrugator run.

Associated with master footage control 32 is footage order control 108 which, connected through line 110, is used to step the counters in master footage control 32 to the desired numerical positions from which count down of footage consumed is initiated. Thus, when the stepping relays are to be set, each stepping relay decade is pulsed down from zero to the desired initial counting position; this is conveniently done by a telephone dial type pulser which, carrying down from zero, emits one pulse when the counter is to be set to 9, two pulses when the counter is to be set at 8, etc. Each of the count down decade counters has a front display showing a counter position and the counters are assembled in a line so as to display the actual number of feet to be counted down to the operator. This number, of course, corresponds to the actual number of feet remaining to be produced once the count down operation has been commenced.

Inasmuch as the counters, steppers, etc., are commercially available units, their assemblage being well understood to those skilled in the art, drawings and detailed exposition of this aspect of the invention have been omitted. Associated with the master footage counters is alarm 112, connected thereto by line 114. Alarm 112 warns the single facer operator by light or audible alarm, or both, of the nearing completion of the ordered footage production. Conveniently, the alarm may be triggered by the arrival of the hundred counter at zero, and will thus advise the operator that less than 100 feet remain to be produced. The operator can then prepare to shut down the single facer and set it up for production of single face for the next order.

Differential bridge control 34 is supplied with footage pulse information from web rider 62 and footage rider 24 by means of connecting lines 28 and 116. In its most convenient form, bridge differential control 118 includes a conventional bidirectional counter which combines the function of electrically adding, subtracting, and displaying the difference between two sets of incoming pulses. As used in the invention, pulses from footage rider 24 step the counter up in 10-foot increments, and pulses from web rider 62 step the counter down in 10-foot increments. When the corrugator is in operation, the single facer produces at a speed which is independent of the speed of utilization of the cardboard in the combiner. Hence single facer output is counted up while the amount of material withdrawn by the combiner from the bridge is counted down. This automatic subtraction of the withdrawal from the input yields a net figure showing the amount of material stored in the bridge. In addition to showing the amount of material stored in the bridge, means are provided for showing when a preset upper amount of stored material and a preset lower amount of stored material are reached. Thus, extra contacts on the counters are activated at the preset levels and lights, or bridge alarm 119, at the single facer indicate to the operator that he is producing too much or too little single face.

Figure 3:
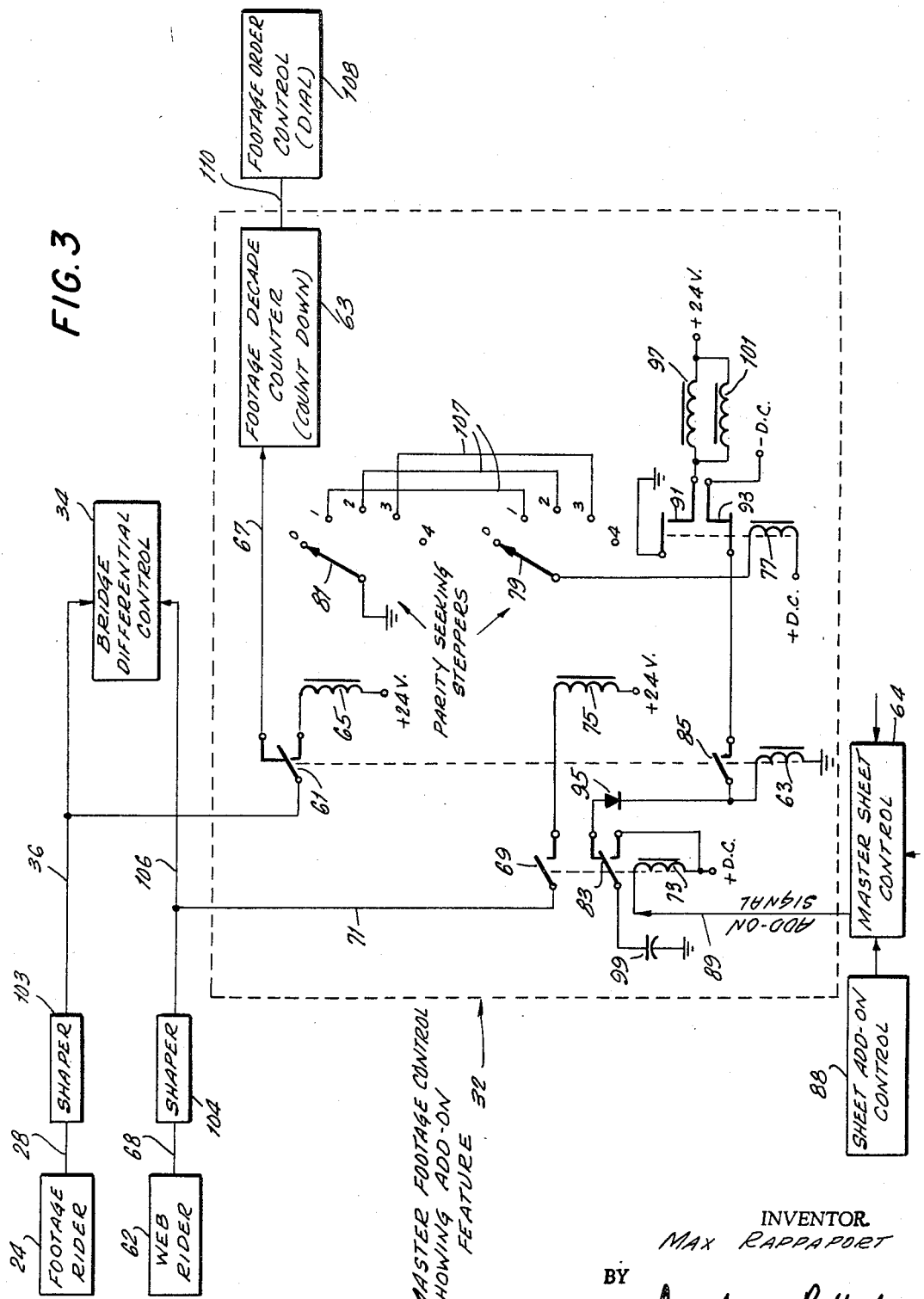
FIG. 3 is a partial schematic showing the operation of the master footage control portion of FIG. 2.

Reference is now made to FIG. 3 in which a portion of the footage control 32, showing the "add-on" feature, is illustrated.

As was mentioned previously, the single facer operator makes an initial setting of the footage order control to the estimated amount of footage required for an order. Upon many occasions, it will be necessary to change this footage order, subject to the control of the combiner operator, to correct the estimated footage required, thus compensating for production lost due to faults in the finished sheet. These faults come from many sources, such as splices, incorrect sheet lengths, tears, etc. According to the invention, the combiner operator can alter the preset sheet production order in sheet control 64, by means of add-on control 88. At this time, master sheet control 64 sends a signal, called the add-on signal, to footage control 32 during the period of time that the specified increased number of sheets is being produced.

The add-on feature for the master footage control is achieved as follows. Pulses from footage rider 24 are amplified and shaped in shaper 103, being then supplied by line 36 to bridge differential control 34 and to master footage control 32. In master footage control 32, the footage rider signal, consisting of pulses arriving at a rate of one pulse per 10 feet of single face produced, is fed through the normally closed contact of double-throw switch 61 of footage add-on relay 63 to the footage counter decades, shown as block 63, when switch 61 is activated, the signal passes to stepping relay solenoid 65. When add-on relay 63 is energized, the footage pulses are fed to stepper solenoid 65.

The footage proportional pulses derived from web rider 62 are fed to pulse amplifier-shaper 104 and thence through normally open, single-pole, single-throw switch 69 of add-on control relay 73, to second add-on stepper solenoid 75. Steppers 65 and 75 are wired for parity seeking. Thus, corresponding terminals 1, 2, 3, 4, etc., on the selector deck of the footage-signal-controlled stepping relay 65 are wired to like terminals of the web-signal-activated stepping relay 75 by means of connecting leads 107. D.C. power is supplied to the coil of reset relay 77 which is series connected with wiper arm 79 of stepper relay 75. Wiper arm 81 of stepper relay 65 is connected to ground. Thus, when the stepping relays are in corresponding positions, 1, 2, or 3, etc., the circuit between reset relay 77 and ground is completed. When the two wipers are in contact with correspondingly numbered terminals, the stepping switches are said to be parity.

Logical control of the add-on feature is provided by means of single-pole double-throw switch section 83 on add-on relay 73, single-pole, single-throw, normally open switch 85 on add-on relay 63, and normally closed, single-pole, single-throw switch section 94 on reset relay 77. When control relay 73 is open, as normally, double-throw relay switch 83 serves to connect series connected capacitor 99 and diode 95 to one side of the solenoid of relay 63. The other side of the coil of relay 63 is connected to ground. Normally open switch 85 of relay 63 is also connected to the live end of the coil of relay 63 and controls, through series-connected relay contacts 93, the supply of energizing voltage to relay 63 as well as to relay pulse supply capacitor 95. A normally open switch 91 on reset relay 77, when closed, energizes homing coils 97 and 101 of stepping relay 65 and 75, respectively, for the purpose of restoring the steppers to zero when the add-on operation is complete.

Operation of the add-on circuit is as follows. During the period of time that add-on is occurring at master sheet control 64, a contact is closed, completing the circuit through add-on signal line 89 and add-on relay coil 73 to ground, energizing the relay and closing switch sections 69 and 83. The closing of relay contact 69 transmits web rider pulses from shaper 104 to the coil of stepper relay 75, causing wiper arm to advance from zero, one step for each pulse received. (For the sake of simplicity, only a portion of one decade of the stepper system has been shown. It will be understood by those skilled in the art that more decades, sequentially arranged, can be added to provide as much capacity as required.) Thus, if we assume that 3 pulses are received by stepper 75, wiper 79 will stop at terminal 3, completing the connection to terminal 3 on the corresponding deck of stepper relay 65. Meanwhile, double-throw switch section 83 has been actuated to charge capacitor 99 to the D.C. operating voltage. Upon completion of the add-on operation, control relay 73 is deenergized by master sheet control 64, stopping transmission of web rider signals to stepper coil 75 and transferring capacitor 99 from its charging connection to its discharge connection to solenoid 63 through diode 95. The closing of relay 63 brought about by the discharge of capacitor 99 interrupts the flow of pulses from footage rider pulse shaper 104 to footage decade counter 63 and transmits the pulses to the coil of stepper relay 65, where each incoming pulse advances stepper wiper arm 81 one step. Meanwhile, switch 85 is also closed on relay 63, supplying energy from normally closed switch 93 for keeping add-on relay 63 energized. When stepper relay wiping arm 81 reaches terminal 3, parity is reached, and the circuit is completed which energizes reset relay 77. The energizing of relay 77 opens contacts 93, interrupting the supply of electricity to add-on relay 63 and returning add-on relay switch 61 to its normal position, supplying footage rider pulses to the footage decade counter. The closing of contacts 91 of reset relay 77 energizes stepper homing coils 97 and 101, resetting stepping relays 65 and 75 to zero and deenergizes coil 77.

Thus, during operation of the add-on, a quantity of footage, corresponding to that utilized in the combiner is counted. When the add-on instruction is completed, the add-on control interrupts count down operation of the footage decade counter until the parity sensitive steppers report that a comparable quantity of footage has passed by footage rider 24. At this point decade counter 63 commences its count down again with its reading undistributed by the production of extra material.

Sheet control 64 is the central accounting portion of the system for sheet production. In conjunction with sheet-counter add-on 88, the knife operator is provided with a continuous count of the number of sheets which must be produced to complete a given order. He is also enabled to modify the production order to make up for waste sheets. The counting system includes a dual set of counters one of which is used for production in process and the other of which may be set by sheet count preset 86 to the count to be used for the next production order while the first order is being produced.

Sheet control 64 and its auxiliaries are shown in detail in FIG. 11. Two sets of counters are shown consisting of series connected monodecades 501, 503, 505, 507, 509 and 511, 513, 515, 517 and 519. Input pulses for driving the counters are fed to 1's counters 509 and 519 by means of connecting lines 521 and 523 respectively. The counters may be of any type commercially available, such as the "Sodeco" model ITD, and as will be understood by those skilled in the art, are provided with display numbers which, in the preferred form of the invention, count down from zero to show the number of sheets remaining to be produced. Input lines 521 and 523, in the illustrative embodiment of the invention, are supplied with driving pulses from the knife, so that each knife cut reduces the number displayed. In addition, input lines 521 and 523 may be supplied with preset pulses from sheet count preset 88. Single-pole, double-throw, "sheet count transfer" relay switch sections 525 and 527 are wired so that when the switch sections are in their normally closed positions, knife pulses are supplied from "add-on" relay switch section 529 to input line 521 and pulses from sheet count preset 88 are fed to input line 523. "Sheet count transfer" relay solenoid 531, when energized by the application of D.C. power through sheet counter transfer switch 533, switches the inputs of the decade counters so that the lower set of counters is driven by the knife pulses and the upper set of counters is connected for reset and preset.

Connections are not shown for performing reset operation of the counters. As will be understood by those skilled in the art, clearing a set of counters may be occomplished by connecting them in parallel and pulsing them by means of preset pulse switch 88. Each of the counters is provided with a single-pole switch which opens when the individual counter is at zero. If, then, the pulses are fed from the parallel connection to each counter through its own zero switch, the counting action of each counter will stop when it reaches zero. With "Sodeco" monodecade counters activated by telephone dial generated pulses, as in one embodiment of the invention, cleared counters may be preset with new prodution count settings by activating the telephone dial. (In FIG. 11, the telephone dial is represented, for the sake of simplicity, as normally open, single-pole, single-throw preset switch 88.) The telephone dial itself has its numbers reversed, so that units count-down counter 519, for example, will be set at 7 by dialing 7, and thus by pulsing the counter three times. Then, as will be understood by those skilled in the art, the telephone dial emits a homing signal which transfers the input from units counter 519 to tens counter 517, permitting the setting of that counter to the desired number, etc. The last of the sheet counters is provided with connections 526, 528, 530, and 532 for activating lights on alarms for signalling the knife operator when the last 10 sheets and the last sheet have been produced.

The add-on feature of the invention is controlled by means of sheet counter add-on 88, FIG. 11. As was described above, the function of the "add-on" is to permit the knife operator to make up production to offset wastage. Thus, the operator determines how many sheets will be required in addition to those ordered. Then, he sets the desired count in add-on counter monodecades 535, 537, and 539 by means of direct current supplied through push-buttons 541, 543, and 545, respectively. For example, with each push of button 541, hundreds counter 535 will be indexed one step and repeated operation of the button will step it to the desired number. These counters, also, are conventional, being wired in series, with the units decade being supplied with knife pulses through the normally open terminal of "add-on" relay switch section 529. Each add-on counter 535, 537, and 539 has associated with it a zero switch 547, 549, and 551, respectively, the switches being normally open when the associated counter is at zero. At all other times the switch is closed. The add-on circuit is activated by means of D.C. power supplied through either add-on push-button 553 or "add-on" relay holding switch section 555, these switches being wired in parallel with each other; then through any of the counter zero switch sections 547, 549, 551 which may be closed, these switches also being wired in parallel with one another; then through "no add-on" switch 557 to "add-on" relay solenoid 559. "Add-on" relay 559 also closes "add-on" relay switch section 561 which transmits a D.C. add-on signal on line 82 to master footage control 32 for controlling the operation of "add-on" to the footage decade counters.

To add on sheets, the operator manually sets the desired add-on count into the add-on counters. While three counters are shown, it will be understood that more or less may be used, as dictated by circumstance. The operator then pushes add-on button 553 and, since at least one of the counters will not be at zero, D.C. will be supplied to "no add-on" switch 557 and thence to "add-on" relay 529. The action of the relay closes holding switch 555 and transfers the knife pulses flowing from amplifier driver 563 from the input to the sheet counters to the input of the add-on, count down counters. At the same time "add-on" operation of the footage counters is started by the closing of relay switch section 561. When the "add-on" counters have all reached zero, switches 547, 549, and 551 are all open, and the flow of current to "add-on" relay solenoid 559 is interrupted resetting the circuit, stopping "add-on" input in the footage control, and transferring the knife pulse input to the set of sheet counter monodecades then in use. "No add-on" switch 557, shown here, is actually located at the single-facer so that the single-facer operator may, by opening the circuit, (line 84, FIG. 1), tell the system that he has ceased single-face production for this run and that there will not be enough material to make an add-on.

When a production order is complete, transfer of a new production order into active use is effected by closing or opening sheet counter transfer switch 553 to activate "sheet counter transfer" relay 531. This action, by means of "sheet counter transfer" relay switch sections 525 and 527, connects the other set of counters, already provided with next preset sheet count orders into the circuit and removes the used counters, putting the circuitry in condition for them to be preset in turn.

Reference is now made to FIG. 2 for a general description of the sheet size control portion of the invention. As was indicated above, web rider 62 generates two speed pulse signals, the second of these, the "fine" signal, comprising a pulse for every hundredth of an inch of web passing the rider wheel. The train of pulses from web rider 62 is supplied to transfer relay switch section 122, which in its normally closed position transfers the pulses to amplifier-shaper 102. After conventional amplification and shaping to produce a good wave-form, as will be understood by those skilled in the art, the count pulses are passed through count inhibitor gate 124, along connecting line 126, to the inputs of count gate 128 and error gate 158. Pulses emerging from count gate 128 are transmitted to pulse shaping and amplifying network 132, which produces pulses of proper shape and amplitude for driving the counters in sheet size control 136. Sheet size control 136 includes, in one embodiment of the invention, a five decade electronic solid state counter of a type commercially available, which may be set to produce a signal at the end of a predetermined count by means of a selector switch associated with each decade. In the invention, the selector switch takes the form of a stepping switch (see FIG. 8 for detail), wired for automatic, parity-seeking control. A separate bank of hand selector switches provided storage of the next ordered sheet size. Thus, the operator may manually adjust the selector switches to sheet sizes corresponding to that required for the next order to be produced, and the order may automatically be transferred into the counters upon completion of the order in process.

Control 136 emits a signal upon completion of the predetermined sheet length count, which signal is transferred through connecting line 146, shaper 148, and connecting line 150 to auto-manual logic block 152 for comparison with the knife signal. The timing of pulse counting in counter 136 is controlled by counter 128 gate which, in turn, is controlled by a gating signal on connecting line 142 from central logic block 152. Central logic block 152 is controlled, basically, by knife pulses transmitted from knife signal transducer 72 through connecting line 76, and shaper 75. Knife signal transducer 72 may be any conventional electrical pulse producer such as a variable reluctance coil placed adjacent to the path of a magnet rotating in synchronism with the knives, and timed to produce a pulse at the time of each knife cut. Other pulse generators may be employed, as will be understood by those skilled in the art.

In the preferred embodiment of the invention, a two step comparison-correction operation is performed in central logic 152. With the transmission of a first knife signal to logic 152, count gate 128 is turned on, transmitting count pulses to decade counter 136. Decade counter 136, upon completion of the predetermined, or pre-set, number of counts, corresponding to the desired sheet length, then sends a pulse on line 150 which is compared for time of arrival with the second knife pulse, which establishes the actual length of sheet cut. Thus, if the knife cuts a sheet which is longer than the pre-set length in counter 36, the "preset" pulse from decade counter 136 arrives in logic block 152 in advance of the second knife pulse and an "over" signal is transmitted on line 463 to "under-over" relay 472. Meanwhile, the preset pulse has turned error gate 158 "on" and the knife pulse has turned it "off," and the gate has transmitted a number of count pulses proportional to the error length along line 160 towards timing stage 170. If the sheet cut is too short, an "under" signal is transmitted to relay 472 and error gate 158 again passes count pulses towards timing stage 170. The arrival of a third knife pulse resets the counters in sheet size control 136 through reset pulser 476 and starts the comparison-correction cycle again.

As will be seen in greater detail below, the error is measured during the production of a first sheet, and the correction is applied to the knife speed control 78 during the cutting of the second sheet. Thus, count pulses, numerically proportional to the sheet length error are lengthened in shaper 161, and passed to integrating amplifier 164 where they are transformed into a voltage proportional to the error (line 166, FIG. 5.) The proportional error voltage from operational amplifier 164 is fed through line 166 to tolerance network 168 where the error voltage is increased or decreased by predetermined voltages, corresponding to the desired production sheet length tolerances. Within the tolerance band so established, no corrective signal will be forwarded to knife speed control 78. The tolerance corrected error signal voltage is thence fed to timing stage 170, where it is used to time the application of a correction signal to the knife speed control. Included in timing stage 170 is a correction circuit which further modifies the error proportional signal to correct for the non-linear relationship between the knife speed control position and the correction to be applied. The amount of non-linearity compensation introduced is controlled by non-linearity compensator 172, which in turn, is controlled by the setting of the stepping switches in sheet size control 136. The basic function of this non-linearity compensation is explained in considerable detail in Patent No. 3,324,751, entitled Increment Size Adjustment Means issued in the names of Harry Star and Sidney P. Rubinstein inventors on June 13, 1967. Briefly, linearity compensation is required in order to produce incremental changes in the knife speeds of the order of 0.1 inch, regardless of the setting of the knife speed control. If there is no compensation, the voltage which produces a 0.1 inch length adjustment when the "Reeves" drive is making long cuts, will produce a correction of much less than 0.1 inch when the knife is cutting short sheets.

The tolerance and linearity corrected error signals derived as described above are fed from timing stage 170 through under-over control 174 to the motor in knife speed control 178 by means of connections 172 and 80, respectively.

Under-over control 174 determines whether the correction applied to the knife speed control 78 will increase or decrease the speed of operation of the knife drive. This operation is responsive to "under-over" relay 472 (wave form line 463, FIG. 5) which in turn is controlled by logic 152. Under-over selector relay 472 also, through line 188, controls the size of the tolerance band voltage offset applied by tolerance network 168 to the proportional error signal, thus providing individual tolerance adjustments for under and over error corrections. Operation of under-over selector logic block 174 is controlled by a signal transmitted through input line 188 from relay 472.

Sequencer 178 counts the under, over, or "white" (no error) signal pulses being transmitted to knife speed control 78 and, subject to the control of the operator, permits the delay of speed control correction until a number of like error signals has occured and an error trend is established. This procedure is desirable because the "Reeves" drive characteristically changes its speed of operation from time to time in varying amounts and directions. Since many of these speed changes are negligible and non-recurring, the continuous application of correction signals to the speed control tends to aggravate the speed error, rather than correcting it. Also, the wasted energy only serves to overheat the speed control mechanism. By means of the sequencer control, normal hunting of the Reeves drive is permitted, with the application of correcting actions deferred until a definite trend in speed error is apparent.

Other functions of the invention shown in FIG. 2 are briefly described as follows.

Drive shaft take-off 70, whose output may be selected by transfer relay switch 122, is provided to supply a signal proportional to web speed when the combiner is not being run; this permits the establishment of knife speeds at a new rate during set up of the combiner, slitter, and knives for a new run without the need for actually cutting the board and wasting it.

Acceleration-deceleration control 194 modifies the system operation in response to a change in overall knife and combiner speed so that the operation of the sequencer is suppressed during the speed change, permitting direct application of error signals to the knife speed control.

Low speed cut-off 196 cuts off measurement operations during the time the knife operating speed drops below a certain value.

Transfer control 194, subject to the control of transfer order 196 and preset sheet length order 416, controls the operating logic connections during various operations.

Auto-manual control 265 (see FIG. 7) permits by-passing the entire automatic knife speed control function for control of the knife speed by hand.

Knife pulses, derived from shaper 75, are also transmitted to master sheet control 64 through low speed cut-off gate 51. The pulses, turned off by gate 51 under control of low speed cut-off 196 when operation of the machine drops below a certain speed, drive conventional counters, which count down from the "preset" or ordered sheet count to zero, giving an order completion signal to the operator when the order is complete.

Figure 4:
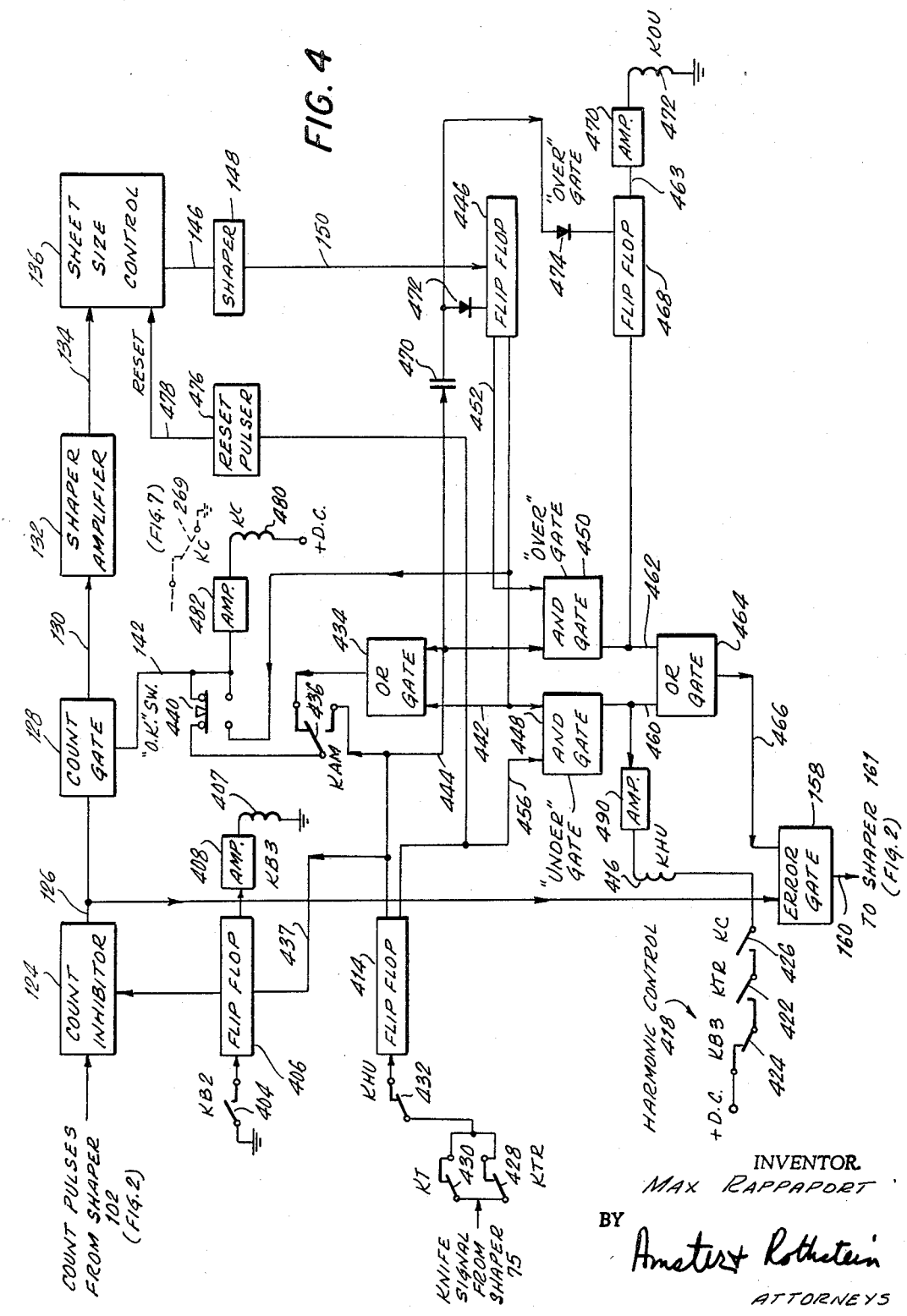
FIG. 4 is a block diagram with schematic detail of the central logic portion of FIG. 2.
Figure 5:
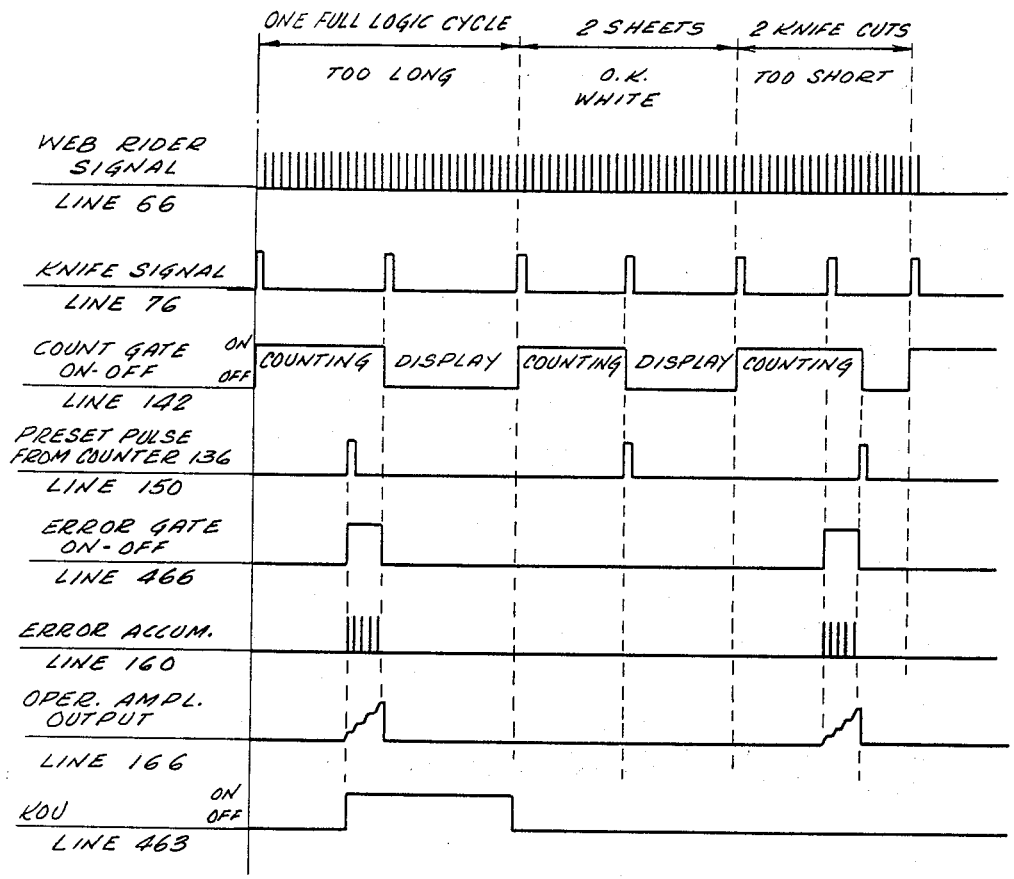
FIG. 5 shows some key wave forms produced in the operation of the central logic of FIG. 3.

FIG. 4 illustrates in essential detail the structure of count error logic 152 (FIG. 2). FIG. 5 shows certain key wave forms in the logic. Basically, the logic is like that employed in patent application Ser. No. 446,455, filed Mar. 10, 1965, which is a continuation of patent application Ser. No. 182,458, filed in the names of Harry Starr and Sydney P. Rubinstein on Mar. 26, 1962, and entitled "Automatic Size Preset and Automatic Length Adjustment System for Cut Off Machine and the Like".

As indicated above, count error logic or central count logic 152 compares the desired sheet length with the actual sheet length cut to determine whether the sheet cut is short, long, or of the correct length, and, if the sheet length is incorrect, to provide information for appropriate, automatic, corrective action. According to the invention, related operations include the supply of error signals to the knife speed control, control of sheet length counting operations during change of the ordered sheet length under control of either the transfer order button or the preset length order button, activation of the "harmonic" control to prevent the system from locking on to an incorrect sheet length when going from an ordered short length to an ordered long length, provision for checking the length measure then in use in the sheet size control during operation of the system, as well as providing a display of the actual length of each sheet cut when the system is in manual operation. To this end, count pulses, (line 66, FIG. 5), received from web rider 62 and shaper 102 and having a repitition rate proportional to the speed of flow of the web to the knives, are passed through count inhibitor 124 to count gate 128, and thence to shaper amplifier 132 for reshaping and amplification for driving the counters of sheet size control 136. Both count inhibitor 124 and count gate 128 are pulse "and" gates and permit the through passage of the count pulses when turned on by the action of flip-flop 406, and "or" gate 434, respectively. Flip-flop 406 is a bistable or "set-reset" flip-flop having an input controlled by "second binary" relay switch section 404 and a second input controlled through connecting line 437 by knife flip-flop 414. Flip-flop 406 is connected so that count pulses are ordinarily permitted to flow through count inhibitor 124, but, under control of "second binary" relay switch section 404, the flow of count pulses to the counters may be inhibited. Inhibition of the count pulse flow, when initiated by relay switch 404, is removed by the reset action of flip-flop 414.

During automatic operation of the control system, count gate 128 is controlled by means of a DC signal received from "or" gate 434 along a path which includes series-connected switches 436 and 440 (line 142, FIG. 5). Relay switch section 436 is controlled by "automatic-manual" relay 243 (FIG. 7) and is a single-pole, double-throw switch which, in its normally closed position, transmits DC control signals from "or" gate 434 to one leg of "OK" switch section 440. "OK" switch section 440 is a single-pole, double-throw switch, manually operated, and has its normally closed leg in series with the normally closed leg of "auto-manual" relay switch section 436. With both "auto-manual" switch section 436 and "OK" switch 440 in their normally closed positions, the action of count gate 128 is controlled by "or" gate 434. "Or" gate 434 is a standard DC "or" gate and is turned on when a signal is applied to either input lead 442, input lead 444, or both input leads.

Count pulses passed to sheet size control 136 are counted therein and, when a predetermined count, corresponding to a predetermined sheet length, is reached, sheet size control 136 emits a "preset" pulse on output line 146 which is passed through shaper 148 to improve its wave form. Thence the "preset" pulse passes along line 150 (see FIG. 5) to flip-flop 446 for controlling the action of "and" gates 448 and 450. Flip-flop 446, being bistable, provides, when pulsed by sheet control 136, an "on" voltage through line 452 to "and" gate 450 and an "off" voltage to "and" gate 448 through line 442. When reset, the voltages applied to gates 448 and 450 are, of course, reversed. "And" gates 448 and 450 have a second set of input lines 456 and 444 respectively, which are controlled by knife flip-flop 414. Knife flip-flop 414 is triggered by knife pulses transmitted from knife pulse generator 72 through shaper 75, which corrects the wave form of the incoming pulses. The pulses from shaper 75 are transmitted (line 76, FIG. 5) through parallel-connected "transfer" relay switch section 428 and "timing" relay switch section 430, and thence through "hold-under" relay switch section 432 to flip-flop 414. All of these single-pole, single-throw switch sections are normally closed. Each time that a knife cut is made, a pulse is received by flip-flop 414, which, being a bistable flip-flop, assumes one condition or the other with each succeeding knife pulse. Thus, the first knife pulse applies an "on" signal through line 456 to "and" gate 448 and or an "off" signal, through line 444 to "and" gate 450.

The outputs of "and" gates 448 and 450, are fed through connecting lines 460 and 462, respectively, to the inputs of "or" gate 464. "Or" gate 464 is a standard DC "or" gate, giving an output on line 466 (see FIG. 5) when either one, the other, or both inputs is turned on. The effect of applying an "on" signal through line 466 to error gate 158, which is a pulse "and" gate, is to permit the passage of error accumulation count pulses derived from line 126, the output of count inhibitor 124, to output line 160 (FIG. 5). Thence, the count pulses pass through shaper 161, into the error measuring and timing operattions embraced in blocks 164, 168, and 170 (FIG. 2).

The operation of the count logic just described is as follows:

During automatic operation, count pulses are continuously received from shaper 102 which represent, in frequency, the speed of flow of the web to the knives. At the same time, knife pulses are received from shaper 75 at a rate of one pulse per cut, synchronously with the cut. Sheet length comparison is initiated by the action of a first knife pulse which triggers flip-flop 414, resetting flip-flop 406, and turning on "or" gate 434, as well as applying a signal to one input of "and" gate 450. At the same time, the reset signal is transmitted through capacitance 470 and isolating diodes 472 and 474 to "preset" flip-flop 446 and to "over-under" flip-flop 468 to restore them to their normal conditions. Flip-flop 446 thus puts an "on" signal through line 442 to "or" gate 434 and "and" gate 128. Count pulses are thus supplied through count inhibitor 124 and count gate 128 to sheet size control 136 where, upon completing the predetermined, or "preset" count corresponding to the desired sheet length, sheet size control 136 emits a pulse to flip-flop 446. Flip-flop 446, thus switched, applies a voltage through output line 452 to the second input of "and" gate 450, and since the second knife pulse has not yet been received, "and" gate 450 transmits a signal to "or" gate 464. "Or" gate 464 then energizes error gate 158, transmitting count pulses from line 126 to the error timing circuitry. At the same time, flip-flop 468 is activated, turning on "over-under" relay 472, signifying a sheet which is too long. Upon receipt of a second knife pulse, flip-flop 414 is restored to its original condition, removing the input signal on line 444 from "and" gate 450, and terminating, through the action of error gate 158, the transmission of count pulses to the timing network. Thus, where the "preset" pulse is emitted by sheet size control 136 prior to arrival of a second knife pulse, an "over" signal is generated at "and" gate 450, and the number of pulses transmitted through error gate 158 is proportional to the length, since the count pulse train passing through gate 158 is terminated by the arrival of the second knife pulse which denotes the actual sheet length cut. The function of "under-over" flip-flop 468 is to maintain "under-over" relay 472 energized, storing the information that the last sheet was an "over" sheet, until the first, or start knife pulse indicating the start of a new measuring cycle is received. In the event that the second knife pulse is received before the "preset" pulse is emitted by sheet size control 136, as when short, or "under" sheet lengths are produced, the signal being maintained on one input of "and" gate 448 by flip-flop 446, when coupled with the arrival of the second knife pulse, as signaled by flip-flop 414 on line 456, results in transmission of count pulses through error gate 158 to the timing network; in this case "and" gate 448 turns on "or" gate 464 which, in turn, activates error gate 158.

With the measurement of a short sheet or of an "OK" sheet, it will be noted that "over-under" relay 472 remains deenergized.

It will also be noted that reset of the counters in sheet size control 136 is accomplished, through reset pulses 476 by the negative-going voltage emitted on line 456 by knife flip-flop 414 as it is activated by the first knife pulse.

As will be seen, knife speed corrections are made after the completion of a measurement, that is, between the second and third knife pulses. The third knife pulses is, of course, a first knife pulse, insofar as the logic of the system is concerned.

The application of correction signals to the knife speed control correction motor is controlled by means of "cycling" relay 480 which is energized by flow of direct current controlled by amplifier 482. Amplifier 482, when OK switch 440 and "auto-manual" relay switch section 436 are in their normally closed positions, is controlled by "or" gate 434. "Or" gate 434 is activated either by "knife" flip-flop 414, being turned on by the first knife pulse and off by the second, or it is turned on by activation of flip-flop 446 by the "preset" pulse from counter 126. Thus, if a short sheet occurs, "or" gate 434 is kept on by the action of flip-flop 468. "Cycling" relay 480 is therefore closed during the period of time that count gate 128 is open, that is, the period of time between the first knife cut and the "preset" pulse or the second knife pulse, whichever is later. "Cycling" relay 480 controls "cycling" relay switch contacts 269 (FIG. 7) which, in turn, control the operation of "display" relay solenoid 267 when the system is in automatic operation. It will be noted that, during automatic operation, because "cycling" relay switch contacts 269 are normally closed, "display" relay solenoid 267 is normally energized; "display" relay 267 is deenergized upon the energizing of "cycling" relay 480. It is during the "display" period as controlled by the cycling relay and thus, while a second sheet is being cut, that correction of the knife speed occurs.

The function of "OK" switch 440 is to provide a means for displaying the sheet length currently set in sheet size control 136. As has been previously indicated, sheet size control 136 includes "Nixie" tubes for displaying the count achieved in each counter, and thus for displaying the actual sheet size cut. Pushing "OK" switch 440 transfers the control input of count gate 128 from "or" gate 434 to the output of "preset" flip-flop 446. The output of flip-flop 446 occurs when a "preset" pulse is emitted by counter 136 at the end of the "preset" count. Therefore, turning count gate 128 off at the end of the "preset" count causes the display lights to show the actual count set into sheet size control 136. "OK" switch section 441 (FIG. 8) operates "first" and "second" binary relays 384 and 401, as described below, to disable the count until the next knife pulse and to wipe out accumulated error signals. A fresh full count is thus made in the counters when the "OK" button is pushed.

"Auto-manual" relay switch section 436, which is normally closed during automatic operation, transfers control of count gate 128 to the knife flip-flop 414, alone, when auto-manual control switch 265 (see FIG. 7) is set at manual. As indicated below, when the system is in the manual mode of operation, changes in sheet length are made in fixed increments under control of under or over push buttons, and it is desirable to have the "Nixie" display of sheet size control 136 show the actual sheet length being cut. To this end, energizing auto-manual relay 243 by switch 265 (FIG. 7) transfers the control of the input to count gate 128 from the output of "or" gate 434 to that output of flip-flop 414 (line 444) which is on during the period of time between the first and second knife pulse. Then, during the period of time between the second and third knife pulses, the actual sheet length produced by the second knife cut is displayed on sheet size control 136.

The functions of "third binary" relay 407 and of "hold-under" relay 416 are related to the harmonic control feature of the invention and will be discussed below during discussion of the "preset" mode of control operation. During "preset" operation of the machine, that is, when a new "preset" figure substantially different from the one previously in use in sheet size control 136 is being automatically transferred into the counters, and when the new sheet length is equal to or greater than twice the size of that previously set, it is possible for the logic to lock on to an incorrect short length. It is a feature of the invention that such lock-ons are prevented by the harmonic control.

Reference is now made to FIG. 6 where the action of the tolerance network, non-linearity compensator, and timing stage are illustrated in detail.

As was indicated previously (FIG. 4) error gate 158, which is a pulse "and" gate, controls the transmission of a number of count pulses received from connecting line 126 to error pulse shaper 161, the length of the pulse train transmitted being proportional to the "over" or "under" error signal length derived in the central count error logic. This pulse train is shown in FIG. 5 at line 160. The pulses themselves, which are in effect, transmitted from web rider shaper 102, are of essentially constant amplitude, and each have a pulse length of approximately 8 micro-seconds as determined by the magnetically operated vacuum reed switch. For handling in subsequent operations, it is desirable to work with longer pulses, so error pulse shaper 161, in a manner well known in the art, changes the pulse length to approximately 50 micro-seconds, without changing the height or repetition rate of the pulses. At the same time pulses of uniform shape are assured.

The pulses from error pulse shaper 161 are then fed to an integrating operational amplifier shown symbolically as operational amplifier block 164 provided with shunt capacitor 165. By this means, the number of pulses in the error signal is, in effect, counted additively, and a voltage is supplied to amplifier output line 166 which is proportional to the number of pulses. (See FIG. 5, line 166.) In one embodiment of the invention, the amplifier gain is set to yield an output voltage varying between 0 and 8 volts proportionally to an input pulse count varying from 0 to 200 pulses. It will be understood by those skilled in the art that, for example, typical combiner maximum operating speeds may be as high as 600 ft. per minute. At these operating speeds, web rider pulses will be generated at a rate of 12,000 pulses per second, corresponding to an upper frequency limit in count of 12 kilocycles. Accordingly, bank width of the operational amplifier system must be such that linearity is preserved over the operating frequency range of from 0 to 12 kilocycles.

The output of operational amplifier 164, is ultimately destined for storage in timing capacitance 167. First, however, it passes through tolerance network 168 and a series of relay controlled switches the purpose of which will be detailed below.

Tolerance network 168 is interposed between the output of operational amplifier 164 and timing capacitor 167 for the purpose of adjusting the voltage accumulated in capacitance 167 by amounts related to the desired tolerance. Thus, where it is desired to suppress or inhibit correcting action by a given tolerance in acceptable sheet length, a fixed voltage is subtracted from the voltage accumulating in timing capacitor 167. In general, the preferred mode of operation of the invention is with a tolerance corresponding to a linear length of approximately $\frac{1}{10}$ of an inch on sheet errors in the over length direction. Thus, if a sheet which is 50.0 inches long is being produced, it will ordinarily be acceptable to produce a sheet of about 50.1 inches in length, and tolerance network 168 will be set to offset the generated proportional error voltage by an amount corresponding to $\frac{1}{10}$ of an inch. Similarly, it may be desirable to provide an adjustment which initiates connection for all "under" sheet lengths by which under corrections may be initiated without (e.g., with zero tolerance in short length) offset, and a second offset voltage control for setting to this voltage. Finally, when setting the knife speed to produce a new sheet length, it is desirable to increase the size of the tolerance band by a substantial amount so as to provide a large window, or target, for the control circuitry to hit as the knife speed setting rapidly travels towards the desired length. All these functions are performed by the tolerance network, under control of the tolerance selection switch portions of "over-under" relay 472 (FIG. 4) and transfer relay 418 (FIG. 9). The desired offset voltage is supplied by means of potentiometers 159, 161, and 163 which are all connected in parallel across centrally tapped voltage divider 165. Battery 169 is also connected across resistor 165 to maintain one end of the resistor at a positive potential and the opposite end of the resistor at a negative potential, both relative to the tap. The output of proportional amplifier 164 is connected to the tap. Thus, each of the taps on potentiometers 159, 161, or 163 may be adjusted to a voltage which is above or below that on incoming line 166 by an amount proportional to the distance each tap is away from the voltage center of its potentiometer. In the drawing, potentiometer 159 is shown as the "over" tolerance offset potentiometer, and its tap is connected through line 171 to the normally closed terminal of "over-under" relay switch section 173. Similarly, the tap on "under" potentiometer 161 is connected by line 175 to the normally open terminal of single-pole, double-throw switch section 173. Thus, when switchblade 173 is in the upper or normally closed position as shown, the voltage developed in timing capacitance 167 (by accumulation of charge delivered by integrating operational amplifier 164) will be offset by the desired operating tolerance in the "over" direction. Similarly, when "over-under" relay switch section 173 is connected to "under" potentiometer 161, the desired "under," offset or bias voltage would be fed to capacitance 167. Similarly, when the mode of operation is changed from normal, to "preset," transfer relay switch section 177 will change the connection to timing capacitance 167 to preset tolerance potentiometer 163, and the proportional error voltage will be provided with the tolerance band for this mode of operation.

It will be noted that during normal, automatic operation of the control system, "auto-manual" relay switch section 179 is in its normally closed position and transmits the proportional error signal connected for tolerance as described above, through the normally closed contacts of "display" relay switch 181 to timing capacitor 167. During "manual" operation, as seen below, "auto-manual" relay switch section 179 transfers a predetermined voltage derived from potentiometer 207 to timing capacitance 167.

The error-proportional voltage, connected for the desired tolerance having been thus established in timing capacitance 167, the function of the timing control and the nonlinearity combination will be described.

As was noted above, the measurement of the sheet length error is performed during the cutting of one sheet, and the knife speed correction, if any, is made during the next cut, subject to control of cycling relay 480 and display relay 267.

Timing stage 170 includes input line 183 connecting the normally open terminal of single-pole, double-throw, display relay switch section 181 to the input of cathode follower 185. Cathode follower 185 serves the functions of matching impedances and driving the gate electrode on silicon controlled rectifier 187. When connected by display relay switch section 181, timing capacitance 167 discharges through one of a number of non-linearity compensating resistors 193, 195, 197, 199, etc., as selected by tap switch 201, the rate of discharge being a well known function of the capacitance and resistance of these elements. Tap switch 201 is one deck of a stepping switch controlling preset sheet length as discussed below and shown in FIG. 8. Silicon controlled rectifier 187 is connected in series with the coil of timing relay 189, and a voltage supplied from AC source 203. Control rectifier 187 is normally biased off, as will be understood by those skilled in the art, by cathode follower 185, and is turned on by the application of a voltage to the control electrode of a sufficient magnitude to cause conduction. When the rectifier conducts, current flows through timing relay 189 causing timing relay switch contacts 205 to close and transmitting a DC voltage to "under-over" control 174 (see FIGS. 2 and 7). When capacitance 167 has fully discharged, the output of cathode follower 185 will return to 0, thus turning off silicon controlled rectifier 187, and permitting "timing" relay 189 to open. This in turn opens contacts 205, and stops the flow of direct current to "over-under" control 174.

As was previously indicated, nonlinearity compensation is required when changing the knife speed control setting to compensate for the non-linear response in knife speed to fixed increments of speed control adjustment over different portions of the speed control range. In accordance with the invention, this is accomplished, in an approximate manner, by dividing the range of speed control into four or five steps and altering the rate of discharge of timing capacitor 167 to a degree appropriate for each step in the range of speed correction. Thus, one of a number of variable resistances 193, 195, 197, or 199, is chosen by means of selector switch 201 under control of sheet size control 136, an appropriate resistance being selected automatically for a given range of ordered sheet size. The compensation required for each of these predetermined sheet size ranges may be set individually by appropriate variation of the individual resistances 193, etc.

Timing of reset of the tolerance network circuit for the next measurement of sheet length error is controlled by "display" relay switch section 181, which is restored to the timing capacitance charging position by release of the cycling relay when the next count cycles is started.

Provision is also made in the circuitry of the timing stage for the substitution of a fixed pulse length control voltage for the error proportional timing voltage described above. Thus, when knife speed changes are to be made by "manual" control, switch 179 transfers under control of "auto-manual" relay 265 to connect the output tap of potentiometer 207, through the normally closed contacts of switch 181 to timing capacitor 167. A DC voltage which is proportional to the sheet length increment to be used as a correction is picked off potentiometer 207. Then, when switch 181 moves, as directed by "display" relay 267, the accumulated charge on timing capacitor 167 is transferred to the timing network, being automatically corrected for linearity as before.

In many modes of operation of the control it is frequently desired to interrupt automatic operation of the sheet length control; it is therefore desirable to remove any charge that may be stored in timing capacitor 167. This is done by normally open, single-pole, single-throw second "binary" relay switch section 209, which, when closed, grounds the capacitor, removing the charge.

Reference is now made to FIG. 7 in which are shown over-under control 174 and sequencer 178, for transferring and coordinating the application of the timed correction from timing stage 170 to knife motor speed control 78. As will be seen from FIG. 2, various control signals, including those from the "cycling" relay and the over-under signal from count error logic block 152, are set into over-under control 174 and sequencer 178 where they are utilized, first, to check for a trend or significant sequence of either "under" or "over" correction signals, and then, if such a trend exists, to time the operation of the knife speed control and its direction.

In FIG. 7, DC power, controlled by "timing" relay switch sections 205 and 211 is supplied through two cascades of relay switch sections to the solenoids of "under" relay 213 and "over" relay 215 respectively. "Under" relay 213 and "over" relay 215, may be connected to ground through anyone of four paths, as follows: through "under" stepper selector switch 228 and "under" parity-seeking stepper switch 223; through "over" stepper selector switch 225 and "over" partity-seeking stepper switch 227; through "bypass" relay switch section 229; or through "auto-manual" relay switch section 233. When any one of these switches is closed, grounding the stepper solenoids, the application of a voltage to "over-under" control 174 by timing relay switch 205 will cause either "under" relay 213 or "over" relay 215 to pull in, closing either of the associated relay switches 235 or 263 and timing the application of electric power from supply line 237 drive the knife speed control motor in forward, or reverse, as required.

The ground paths through "under" and "over" stepping relay switches 223 and 227 are part of the sequence control, being used to establish the existence of error trends before permitting the application of a correction to the knife speed control motors. These switches are bypassed, in effect, by the other switches named when sequential control is inappropriate. Such instances include: acceleration, deceleration, or low speed cut-off operation of the combiner; a change in the sheet length set in the sheet length counters; and "manual" operation of the knife control.

Broadly speaking, "over-under" control 174 takes the sheet length error proportional signal, as modified for tolerance and non-linearity compensation, and the "over-under" information from the central logic and applies the information to produce knife speed control correction. To this end, error signals from timing relay switch 205 are fed through normally closed "auto-manual" relay switch section 241 to single-pole, double-throw switch section 239 on "over-under" relay 239. "Auto-manual" relay switch section 241 interrupts the flow of error signals when the unit is in manual operation. The normally closed output terminal of "over-under" relay switch section 239 is connected through normally closed switch section 240 of two pole, double-throw momentary acting switch 245 and through single-pole, single-throw, normally closed "under" relay switch section 249 to the coil of "under" relay 213. Similarly, connection is made from the normally open contact of "over-under" relay switch section 239 to normally closed contacts 251 of two pole, double-throw, momentary acting switch 253 and through single-pole, single-throw, normally closed "under" relay switch section 257 to the coil of "over" relay 215. Thus, timing pulses generated by "timing" relay switch 205 will be transferred to the coil of "under" relay 213 when "over-under" relay 239 is not energized and to the coil of "over" relay 215 when "over-under" relay 239 is energized.

If, for example, "under" corrections are being made, the closing of "under" relay 213 also causes normally closed "under" relay switch section 257 to open and normally open "under" relay switch section 259 to close. The opening of relay switch section 257, prevents the inadvertent application of voltage to the coil of "over" relay 215, while the closing of normally "under" relay switch section 259 completes a holding circuit directly between the coil of relay 213 and timing relay switch 205, thus providing a path through which, regardless of subsequent changes in position of "auto-manual" relay switch section 241 and "over-under" relay switch section 239, "under" relay 213 is maintained in energized condition until completion of the timed correction pulse being received. Similarly, during "over" corrections, the solenoid of "over" relay 215 is supplied with holding energy from switch 205 by the closing of normally open, "over" relay switch section 261, while normally closed "over" relay switch section 249 is opened by "over" relay 215 to prevent energizing under relay 213.

Provision is also made in "under-over" control 174 for "manual" application of pulses of predetermined length, compensated for drive control non-linearity, to the knife drive speed control motor. When "manual" operation of the system is desired, "auto-manual" relay 243 is energized by the application of direct current through switch 265. Switch section 179 (FIG. 6) transfers the source of charge for timing capacitor 167 to the tap of potentiometer 209. At the same time, "auto-manual" relay switch section 241, opens, preventing direct application of the timing signals to "over" and "under" relay coils 215 and 213. Energizing "auto-manual" relay 243 also transfers "display" relay coil 267 from its connection with "cycling" relay switch section 269 to a connection with parallel connected, single-pole, single-throw, switch sections 271 and 273 of manual control switches 245 and 253, respectively. The closing of either "manual" switch section 271 or 273 then serves to connect "display" relay coil 263 to ground. Activation of "auto-manual" relay 243 also closes normally open relay switch section 233, providing a direct path to ground for "under" relay 213 and "under" relay 215, bypassing the sequencer. As indicated above (FIG. 4) "auto-manual" relay 243 also transfers the sheet length count display to show actual sheet lengths cut by means of relay switch section 436.

Manual control of the knife speed control, then, is effected by normally open, single-pole switches 245 and 251 which provide direct paths to the coils of "under" and "over" relay coils 213 and 215 from "timing" relay switch section 205.

Thus, with "auto-manual" relay control switch 265 closed, and with the circuits aligned as described above, a single correcting pulse may be injected by the operator pressing "over" button 253, for example, to increase the speed of the drive where the sheet length is too great. Then, as the operator reads his sheet length, either upon the display of sheet length decade counter 136 or by actual hand measurement, incremental changes in the length of the sheet being produced may be made as follows. If a sheet is too long, manual "over" switch 253 is pressed energizing "display" relay 267. Timing capacitor 167, which has been charged by closing "auto-manual" relay switch 265 and the consequent closing of switch section, delivers its charge to cathode follower 185 as a decreasing saw-tooth voltage, the length of which is determined by the rate of discharge of timing capacitor 167 through one of the resistances of the non-linearity compensator 172, in the same manner as was described above in connection with automatic operation. (It will be noted, that, under manual control, it is desirable to produce length corrections which are appropriate for the setting of the knife speed control, that is which are corrected for non-linearity of the speed control. Therefore, the approximate sheet length being cut should be set into decade counter 136 so that the correct compensating resistance will be chosen by non-linearity switch 201. Then, the length of the timing pulses derived from timing stage 170 under "manual" control may be adjusted by means of potentiometer 207 to give substantially constant incremental sheet length changes of the order of one-eighth inch, regardless of the sheet length setting. Of course, other incremental step sizes may be set in, depending upon the needs of the operator.)

Timing stage 170, then, as was the case with automatic operation, causes "timing" relay switch section 205 to close and activate "over" relay 215 for a length of time determined by the time required to discharge capacitor 167. At the same time, normally open, single-pole "timing" relay switch section 279 closes, providing a second ground path to display relay coil 267 and keeping display relay 267 energized until completion of the timing pulse. Meanwhile, "over" relay 215 has been energized, pulling in "over" relay holding switch section 261, and maintaining coil 215 energized until the opening of "timing" relay switch section 205 at the end of the timed pulse. If subsequent corrections are required, "under" switch 245 must be pressed again. Keeping it closed will not cause repeat pulses to flow, since display relay 267 must be cycled to recharge timing capacitance 167.

"Under" corrections are achieved manually by pressing "under" switch 243. The circuit functions are like those just described for the "over" situation.

Sequencer 178 provides a means for controlling the operation of the knife speed control to prevent unnecessary corrections where operation of the knife is somewhat erratic. Thus, with many variable speed knife drives, there is a certain natural hunting of knife speed about the set speed which produces a natural erratic variation of the cut sheet length. In effect, the knife may cut one sheet somewhat short, a second sheet somewhat short and then, perhaps a long sheet or a sheet of the correct length. Where this condition prevails, as may be particularly true of a "Reeves" drive where the belt is wearing or the cones are not quite true, the application of repeated corrections in response to each knife error may merely serve to aggravate the error condition in the opposite direction. Thus, if the knife is going to err of its own accord in the direction of the correction, it is preferable to let this event occur naturally, since the addition of both the inherent correction and the correction to be applied, may overcorrect by a substantial margin. In addition, it is important to minimize the number of corrections called for, since the speed correcting motors, and associated equipment will suffer unnecessary over-heating and excessive wear as a result of repeated, rapid, successive use. Sequencer 178, therefore, delays the application of knife speed corrections until a predetermined number of like corrective actions has been called for, e.g., until a trend in the knife speed away from the set speed is established. The number of errors counted may, for example, be three long, or three short, sheets, in succession, before under-over control 174 is enabled to apply a correction to the knife speed. Thus, sequencer 178 automatically cancels the error count if the knife speed returns to its correct setting or produces a sheet length of the opposite character. This is accomplished, in one embodiment of the invention, by parity seeking "under" stepping relay switch 223, parity seeking "over" stepping relay switch 227, and associated sequence control switches 228 and 225 respectively.

"Under" stepping relay switch section 223 and "over" stepping relay section 227 are driven step-by-step to the various positions by "under" stepping relay solenoid 217 and "over" stepping relay solenoid 219, respectively. They are each returned to zero by "under" stepper homing coil 281 and "over" stepper homing coil 283, respectively. "Under" stepper relay coil 217 and "over" stepper relay coil 219, are, pulsed by means the DC pulse producing action of single-pole, double-throw, timing relay switch section 211, which, even when activated by timing stage 170, supplies power to "over-under" relay switch section 285. "Over-under" relay switch section 285 is controlled by "over-under" relay 472 (FIG. 4) and thus determines which of stepping relays 217 or 219 will be energized by "timing" relay switch 211. "Under-over" relay switch section 285, in its deenergized position, provides a connection to the solenoid of "under" stepping relay 217, and in its energized position provides a path for pulses from timing relay switch section 211 to "over" stepping relay solenoid 219. Cross connections are provided from the inputs to "over" stepping relay solenoid 219 and "under" stepping relay solenoid 217, through diodes 287 and 289, to homing coils 281 and 283, respectively, for the purpose of clearing the count from a stepper, upon receipt of pulses of the opposite character. Thus, if under stepping relay 217 has counted two "under" correction impulses and if the next impulse received calls for an "over" correction, "over" stepping relay 219 will accumulate one count, while "under" stepping relay 217 is cleared of accumulated counts and returns to zero.

A separate circuit accomplished return of "under" stepping relay 217 and "over" stepping relay 219 to a zero, or cleared, condition in the event that timing stage 170 calls for no correction after a particular sheet measurement cycle. In this event, single-pole, double-throw, "timing" relay switch section 211 is not opened and a DC current through normally open, single-pole, single-throw, "white" relay switch section 291, through diodes 293 and 295 and normally open, single-pole, single-throw stepping switch sections 297 and 299, respectively, to "under" stepper homing coil 281 and "over" stepper homing coil 283. "White," relay switch section 291 is energized by "white" relay solenoid 301 which is supplied with energizing power through normally closed, single-pole, single-throw "timing" relay switch section 303, normally open single-pole, single-throw, "display" relay switch section 305, and normally closed "third binary" relay switch section 408. "Stepping" relay, single-pole switch sections 297 and 299 are open when the associated stepping relay is at the zero position and are closed when the associated relay has accumulated one or more counts. The function of all diodes 287, 289, 293, and 295, is to restrict current-flow in any of the circuit branches in which they appear to one direction, preventing confusion or misoperation of the circuit in the event reverse current flow is initiated in that branch by some other operation of an element to which they are connected.

Operation of the stepper clearing circuit, in the event of a no correction that is, a "white" signal, is as follows. When timing stage 170 produces no error signal, timing relay 189 (FIG. 6) remains deenergized leaving "timing" relay switch section 211 connecting through to switch 291 and switch section 303 in its normally closed position. When "display" relay 267 is energized by the closing of "cycling" relay switch section 269, normally open "display" relay switch section 305 is pulled closed, supplying power to the coil of "white" relay 301. "White"

relay 301 is preferably of the slow closing type, so that an opportunity is given for timing relay 189 to pull in, if it is going to do so, before "white" relay switch contacts 291 are closed, thus avoiding possible confusion and the transmission of a "white" signal at the same time that an "over" or "under" signal is being called for by the timing relay. With the closing of "white" relay switch section 291, DC power is applied, through diodes 293 and 295 and through whichever of the single-pole stepping relay switch sections 297 and 299 may be closed, to homing coils 281 or 283. The occurrence of the "white" signal therefore, destroys whatever accumulated count may be present in either "under" stepper 223 or "over" stepper 227.

Operation of the sequencing switching is as follows. If, for example, a series of "over" length correction pulses is being generated by timing stage 170, "over" signals are being generated by count error logic block 152 and transmitted to sequencer 178 to operate "over-under" relay switch section 285 from its deenergized, "under" position to the "over" position, thus connecting "over" stepper solenoid 219 to timing relay switch section 211. When timing relay switch section 211 is closed the timing stage, a DC pulse is supplied to "over" stepper solenoid 219, causing "over" stepper switch 227 to advance from zero position to the one position. Second and third, like, "over" pulses produce the same actions, causing "over" stepper switch blade 227 to advance to the second and third positions. As shown in FIG. 7, sequencer selector switches 228 and 225 are set to the third positions, corresponding to the desire to defer any "over" or "under" corrective action until three, like corrections have been called for. Therefore, when the contact of "over" stepper switch section 227 reaches the third position a circuit is completed between "under" and "over" relays 213 and 215 and ground. The establishment of the ground connection enables relays 213 and 215 to respond to timing pulses as described above in the description of "under-over" control 174. Also, it will be noted that the receipt of only two "over" pulses, followed by either an "under" correction signal or a "white" signal will result in clearing "over" stepping relay 219 and the starting over of the count. It will further be noted that the blades of sequencer control switches 228 and 225 are provided with wipers, which engage the higher numbered contacts (in the illustration those contacts numbered 4, 5, etc.) so that the receipt of 4th, 5th, etc., succeeding "over" pulses will maintain the grounded condition of "over" and "under" relays 213 and 215, producing further corrections without further delay by the sequencer.

Reference is now made to FIG. 8 for detailed descriptions of sheet size control 136, preset storage 184, and a portion of the control circuitry shown functionally in FIG. 2 as transfer control 194.

As was indicated broadly above, sheet size control 136 contains a number of decade counters, 320, 322, and 324, such as are commercially known, for example, by the trade name "Annadex" Model No. DC101A. Ordinarily, control systems of the type described in the illustrative embodiment of the invention will require five such counters to accommodate count pulses arriving at a rate of 100 to the inch, and counting up to 999.9 inches, a range which includes the larger sheet length cutting operations. As shown in FIG. 8, the presentation has been simplified by the omission of the 1's and 10's counters; it will be understood by those skilled in the art that such units would be present where the dashed lines occur. Still more counters may be added, of course, if necessary.

The "Annadex" counters specified are conveniently supplied with "Nixie" type numerical displays and, when arranged alongside one another, to read from left to right, will display numerically the actual length of sheet material cut, etc. Each of the counters 320, 322, etc., is provided with a set of external control leads which are connected to terminals (designated 326) on an associated stepping switch deck 328, 330 and 332, etc., respectively. Each stepping switch deck 328, 330 and 332 is, in turn, mechanically connected to stepping switch decks 334, 336, and 338 in present storage unit 184 by connecting shafts 346, 348 and 192, respectively. Connecting shaft 192 also extends to stepping switch deck 201, here shown in phantom but shown in detail on FIG. 6 for controlling action of non-linearity compensator 172. The positions of the switches in stepping switch decks 328, 330, 332, 334, 336, 338, 201, etc., are controlled by means of stepping switch solenoids 340, 342, and 344, which produce stepped rotation of shafts 346, 348, and 192, respectively, in a manner well known in the art. In the illustration, the contact arms of the stepping switch decks 328 and 334, corresponding to the one-hundredths decade counter, are shown in the .03 position; those for the tenths decade counter, e.g., sections 330 and 336, are shown in the 0.5 position, and the contact blades for rotary switch sections 332 and 338, in the hundredths decade counter, are shown set in the 800 position.

The sheet counters operate as follows. Count pulses fed to the counters are received on line 134 from count gate 128 after being shaped and amplified in shaper 132 to provide signals of appropriate configuration and magnitude for driving the counters in a manner well known in the art. The count pulses are first passed through single-pole, double-throw "transfer" relay switch section 346, which, in its deenergized position, feeds the pulses to the input of hundredths decade counter 320 along input lead 348. When ten pulses have been counted in decade counter 320, a pulse is emitted to connecting line 350 which feeds it through single-pole, double-throw "transfer" relay switch section 352 and connecting line 354 to the input of tenths decade counter 322. When 10 such tenths pulses have been counted by decade counter 322, a pulse is emitted on output lead 356 which connects to the succeeding counter. Thence to the tenths and hundredths counters in a manner well known in the art. Each time that each decade counter counts, a pulse, or DC signal, is applied to the associated output terminal 326 on rotary switch deck 328, 330, or 332, etc. Thus, when wiper blade 328 is set on switch 328 at the third, or .03 position, a pulse (actually a ground connection) is transmitted over connecting lead 360 through single-pole, double-throw "transfer" relay switch section 362 to one input of "and" gate 364, whenever a third or .03 count has been completed. In a similar fashion, when the cumulative counts in the tenths counter have reached the 5th or .05 position, output line 363 is momentarily grounded, grounding a second input to "and" gate 364. Thus, when all the decades have reached the appropriate count, it will be seen that the five input leads to "and" gate 364 are simultaneously grounded, signaling the completion of a sheet length count. "And" gate 364, a five input, coincidence gate, then transmits a control pulse through shaper 148 to count error logic 152 (FIG. 2.)

The function of "transfer" relay switch sections 352, 346 and 362 is to bypass the input signal around hundredths decade counter 320, feeding count pulses directly into tenths decade counter 322, when shaft speed signals are being received at the rate of 10 pulses per inch during "preset" operation of the control system. Thus, switch section 346 gounds the input of the hundredths decade counter 320, switch section 352 transfers the count pulse input to the input of the tenth decade counter, and switch section 362 grounds the hundredths counter input to "and" gate 364, setting the gate for control by the remaining four decade counters alone.

One of the principal features of the invention is the provision of means, subject to automatic control, for changing the preset sheet length set in sheet size control 136 when an order has been completed and a new controlling sheet length must be established. To this end, new sheet lengths may be inserted in preset length storage 90. The center portion of FIG. 8, illustrates one way in which this feature may be accomplished according to the teachings of the invention.

There is provided, for each of the sheet size control stepping switch decks 328, 330, 332, etc., a corresponding multiple position tap switch, 350, 352, 354, etc., and a second stepping switch deck 334, 336, 333, etc., respectively. Each of ten terminals 372 of each stepping switch section, such as switch section 344, is numbered from 0 to 10 and is wired to a correspondingly numbered terminal on its associated selector switch, in this case switch 350. Each of the storage selector switches (350, 352, and 354) is of the type in which a connection is made between a stationary wiper blade (356, 358 and 360) and a central, rotary selector disk (362, 364 and 366) which contacts all but one of the switched terminals 372 simultaneously. One of the terminals, such as terminal number 3 of switch 350, terminal number 5 of switch 352, and terminal number 8 of switch 354, as shown in FIG. 7, will, depending upon the switch settings, not be contacted by central contracting member, thus leaving an open circuit. The stepping relay switch sections are controlled by means of stepper solenoids 340, 342, and 344, which are connected between a source of correct current, through stepping relay interrupter switches 374, 376, and 380, to the moving wiper blades of stepping relay switch sections 334, 336, and 338, respectively. Connection from each stepping relay wiper blade is made to the terminal at which it rests, thence to the associated terminal on the appropriate selector switch, and finally through the selector switch wiping terminal to a common connecting lead 355. Connecting lead 355 may be grounded, subject to operator control, by the closing of transfer order control switch 196 or of transfer relay switch section 382, under circumstances which will be detailed below.

When a given sheet order has been completed, changes in sheet length for a new order may be transferred to sheet size control 136 by setting preset storage dial switches 350, 352, 354, etc., to the appropriate positions. Then, on pressing transfer order manual control button 196, storage switch wiper brushes 356, 358, and 360, are grounded, and, if resetting of any of the stepping switch selector decks is indicated, as by means of a closed circuit through any of the selector switch contacting disks 362, 364, and 366 and the setting of the wiper contacts in preset storage stepping switch sections 334, 336, and 338, a voltage appears across the appropriate stepping switch solenoid 340, 342, or 344, causing the stepping switch to index repeatedly. Operation of each stepping switch ceases when the new preset position has been reached, since the stepping switch will then open the stepping circuit, and upon completion of the stepping action by all the switches, the new sheet length will have been established in sheet size control 136. New selector switch settings may be made subsequently for the next following order and their insertion delayed until the next transfer or preset order is received.

At the same time that transfer order switch 196 is closed to initiate the transfer of a new sheet size setting into sheet size control 136, certain functional operations are made in a way the control circuit is operating (by transfer control circuitry, FIGS. 8 and 9), so that the new settings in sheet size control 136 will be reflected in prompt corrective action by the sheet length control circuitry.

These functions are initiated with the closing of transfer order switch 196 which, in addition to starting the operation of the preset count order transfer switches, also energizes "first binary" 384. One end of "first binary" relay solenoid 384 is connected to a source of direct current, and the other end is connected through diode 386 to transfer order switch button 196 and thence to ground. Alternatively, "first binary" relay coil 384 may be grounded through diode 388 and normally closed single-pole, single-throw switch section 390 on "low speed cut-off" relay 510 (FIG. 10), or through "auto-manual" relay switch section 385. It will be understood, that, with the machine in automatic operation, "low speed cut-off" relay switch 390 is held open unless ripped by the low speed cut-off circuit. Also, "auto-manual" relay switch section 385 is closed only when the controls are set for manual operation.

The energizing of "first binary" relay has the following consequences: single-pole, single-throw "first binary" relay switch section 392 (FIG. 9) is closed, energizing the coil of "bypass" relay 394 (FIG. 9) which, in turn, closes normally open, single-pole, single-throw "bypass" relay switch section 229 (FIG. 7), effectively bypassing sequencer 178 and permitting immediate application of error signals through "under-over" control 174 to the knife speed control motor. At the same time, single-pole, double-throw, "first binary" relay switch section 396 (FIG. 8) transfers storage capacitor 400 from its charging position, a connection to a direct current source, to "second binary" relay coil 401 which is thus energized for the duration of the discharge of capacitance 400. The momentary closing of "second binary" relay 401 thus produced, closes single-pole, single-throw, normally-open switch section 209 (FIG. 6) causing the discharge of any charge which may have been accumulated on timing capacitor 167. The timing stage is thus put in condition to make an immediate, correct, fresh measurement of a new sheet length error. Second, normally open, "second binary" switch section 404 (FIG. 4) is closed, activating flip-flop 406 and stopping transmission of count pulses to error gate 158 and sheet size control 136. At the same time, flip-flop 406 energizes "third binary" relay 407, opening "third binary" relay switch section 409 (FIG. 7) to prevent accidental generation of a "white signal" due to the absence of any charge on timing capacitor 167. "Third binary" relay switch 424 is also opened, preventing energizing of "hold-under" relay 416. Thus, the logic is prepared to start sheet length measurements when desired. Meanwhile (FIG. 9), "bypass" relay coil 394, originally energized by the closing of "first binary" switch section 392, remains energized by current supplied through normally closed "white" relay contacts 410 and "bypass" relay holding switch section 412, now closed.

Completion of the transfer of the preset sheet length order from preset storage 184 is a momentary matter, due to the normal quick action of stepping solenoids 340, 342, and 344 and, therefore, release of transfer order control button 196 has the effect of deenergizing "first binary" relay coil 384, permitting the return of "first binary" relay switch sections 396 and 398 to their normal positions. Now storage capacitor 402, charged to the voltage of the DC source, is transferred to its connection with the coil of "second binary" relay 401 and discharges therethrough. Relay 401 is therefore again closed momentarily, and, through the action of its various switch sections, timing capacitor 167 is again cleared of charge, flip-flop 406 is again activated, and operation of the "white" circuit is again forestalled. This repeated clearing action is necessary because, for example, the occurrence of a premature knife-pulse may have initiated logic operation before the preset order transfer was complete.

In operation, pressing "transfer" order control 196 initiates immediate transfer of the new, ordered sheet length into sheet size control 136. The action of the stepping switches is practically instantaneous, and the transfer action is completed within the normal period of time that the push button is held in. At the same time that the new order length is being transferred into the sheet size control, operation of first, second, and third binary relays, 384, 401, and 407, suppresses operation of the count circuit and bypasses sequencer 178, as described above, during the time between the two succeeding knife pulses required for completion of the error logic, and prevents operation of the "white" circuit by the intermediate knife pulse. When the transfer order button is released, the first and second binary relays are released, and the logic circuits are again cleared. Then, the transmission of the next knife pulse to flip-flop 414 initiates a new sheet length measuring sequence in the count logic. When flip-flop 414 is activated, flip-flop 406 is restored to its initial condition, and count pulses from shaper 102 are transmitted to sheet size control 136, and to error gate 158. Also, third binary relay switch 407 is released, closing the DC path towards "hold-under" relay 416, and, "third binary" relay switch section 409 is closed permitting the flow of direct current to the other switches which control "white" relay 301. Then sheet length measurements proceed normally, generating proportional error and over or under signals for application, as before, through the normal "over-under" control logic to produce corrections of the knife speed. When a "white" signal is generated showing a correct sheet length cut, thet closing of "white" relay 301 opens "white" relay switch section 410, deenergizing "bypass" relay 394. The release of "bypass" relay 394 in turn opens "bypass" relay holding switch 412, as well as "bypass" relay switch 229. The opening of the latter switch restores operation of sequencer 178 for full normal automatic sheet size control.

A new sheet length order may then be established in sheet length storage unit 184 for transfer into sheet size control 136 upon completion of the order just set.

While it is possible to use the order transfer process just described for making large changes in ordered sheet length, it is preferable, however, to restrict its use to the making of small sheet length order changes. Large sheet length order changes may be more rapidly effected by means of "preset" sheet length order control 416 which adapts the control circuitry for rapid response to large error signals. Thus, for example, where operational amplifier 164 would saturate if the error signal were very large, only small changes in knife speed would be effected, since the charge received by timing capacitor 167 would no longer be proportional to the error signal, being limited by the amplifier saturation. Thus, many operations of the knife would be necessary to reach the desired knife operating speed and much waste of valuable corrugated sheet would occur. Also, if the new sheet length ordered were equal to or greater than twice the length of the last sheet order, there would be the danger that the count error logic would erroneously lock onto the exact double length and would control the production of sheets to this length, rather than continuing to call for correction to reach the correct sheet length ordered. This latter problem is sometimes referred to as the "harmonic" problem and is solved by means of harmonic control 418.

In a typical installation, "transfer" order 196 is used for handling sheet length changes up to one or two inches in length, since, at greater lengths, the high sensitivity of the operational amplifier 164, needed for use when an automatic operation fails to produce proportionally large changes in ordered knife speed. With the larger error handling capacity introduced into the system by the circuitry controlled by preset sheet length order 416, changes in sheet length of the order of 40 to 60 inches are handled as a matter of routine. Under some circumstances, that is, where the "Reeves" drive speed range permits, this feature of the invention has produced speed change orders corresponding in length to as much as 190 inches in one jump.

Operation of the system responsive to operation of "preset" sheet length control 416 is as follows. Reference is first made to FIG. 9, where "preset" sheet length control 416 is momentarily closed by the operator, grounding the coil of "transfer" relay 418 which is then energized by means of direct current supplied through normally closed "white" relay switch section 410 from a source of direct current. "Transfer" relay 418 closes a number of transfer relay switch sections including normally open, single-pole, single-throw "transfer" relay holding switch section 420 and normally open "transfer" relay switch section 382 (FIG. 8). "Transfer" relay switch section 420 is wired in parallel with "preset" control button 416 and serves to hold "transfer" relay 418 energized until "white" relay switch section 410 is opened. "Transfer" relay switch section 382 (FIG. 8) is wired in parallel with "transfer" order switch 196, and its closing initiates the same sequence of events that was described above in connection with the operation commanded by transfer order control 196.

In the ordinary combiner operating sequence, large changes in sheet length ordered are accompanied by changes made by the operators in the settings of the slitter blades in slitter and scorer 8 (FIG. 1). It is therefore customary to interrupt the flow of web from combiner 6 to the slitter and to the knives. For this purpose clutch 54 (FIG. 1) is operated to disengage the combiner from the drive. Since there will be no web signal generated by web rider 62, and since it is desirable to save operating time and reduce waste by making knife speed setting changes during the shut down period, a second source of count pulses proportional to the combiner drive speed is provided so that count pulses will be available for operation of the logic in the control system. To this end, combiner drive shaft takeoff 70 transmits count pulses at a rate equivalent to 10 pulses per inch of web along line 74 to one terminal of single-pole, double-throw "transfer" relay switch section 122. Activation of transfer relay 418 switches the input to shaper 102 from web rider 62 to drive shaft take-off 70. From shaper 102, of course, the count pulses are processed as before. Since the count pulse rate is now only 10 to the inch, hundredths counter 320 (FIG. 8) is superfluous and "transfer" relay switch sections 346, 352, and 362 bypass it, delivering the count pulses to the input of tenths counter 356 and grounding hundredths counter input line 361 to "and" gate 364. Simultaneously, "transfer" relay switch 422 (FIG. 6) reduces the gain of operational amplifier 164 by adding a second capacitance 424, of suitable value, in parallel with operational amplifier shunt capacitance 165. Since tolerance network 168 (FIG. 5) is normally set to suppress error signals, for example, of less than one tenth of an inch in size, while feed flow rate information is now being received in tenths inch pulses instead of hundredth inch pulses, and since most sheet errors, during the speed change process are extremely large, the tolerance band is enlarged, according to this aspect to the invention, to present a large target or window, assisting in rapid finding of the correct knife speed. To this end, "transfer" relay switch section 177 (FIG. 6) is activated, supplying a "preset" tolerance voltage correction from tapered resistor 163 in lieu of the "under" and "over" tolerance voltages normally supplied by "over-under" switch section 173. A tolerance band of from two to four inches is usually established by means of potentiometer 163. In the count logic, FIG. 4, normallly open, single-pole, single-throw "transfer" relay switch section 422 is closed enabling "third binary" relay switch section 424 and "cycling" relay switch section 426 to control the application of DC power to "hold-under" relay solenoid 416. Also, single-pole, normally closed, "transfer" relay switch section 428 is opened, leaving the path between knife signal input 72 and flip-flop 414 subject only to control by normally closed, single-pole, "timing" relay switch section 430 and by series connected, normally closed, single-pole, single-throw "hold-under" relay switch section 432. This provision is made so that, during the correction of an extremely large error, full operation of the count logic will not be prevented by the premature occurence of a knife signal when the knife is still running at the old speed. Where going from a very short sheet length setting to a very long one, the necessary count time for generating the error signal would, except for the combined actions of "transfer" relay switch section 438 and "hold-under" relay switch section 432 in preventing resetting of flip-flop 414, be incomplete. Also, when the new length count time would be equal to or greater than twice that of the time required for a knife cut at the old speed, it would be possible for the preset pulse to occur at the time of the third knife pulse and for measurements and corrections to be made relative to the third knife pulse; the result a false accommodation to the old set length called the "harmonic" problem.

Thus, when "preset" operation of the knife speed control is invoked, the closing of "transfer" relay switch section 422 enables "hold-under" relay 416 to function, interrupting the flow of knife pulses to knife flip-flop 414, when a signal is applied to relay amplifier 490 by "and" gate 448, and "third binary" relay switch 424 and "cycling" relay switch 426 are closed. "Third binary" relay switch 424 is normally closed, but is opened when "second binary" relay switch 404 is activated in the wash-out sequence initiated by the closing of "transfer" relay switch section 382. (See the description of the wash-out action initiated by the equivalent closing of "transfer" order control 196 above and FIG. 8.) The "third binary" thus acts to prevent closing of "hold-under" relay 416 until, at least one pulse has activated the count logic. "Cycling" relay switch 426 is closed by the activation of "or" gate 434, and remains closed until the start of the "display" (correction) portion of the cycle.

Thus, when a second knife pulse is received by flip-flop 414, changing its condition, and turning on "and" gate 448, "hold-under" relay 416 is energized and the flow of knife pulses to the logic is interrupted. Relay 416 is released when "cycling" relay switch 426 is opened and "and" gate 448 is turned off by the arrival of a "preset" pulse at flip-flop 446. "Hold-under" relay switch 432 is then closed, and, when the "display" or knife speed correction, portion of the cycle is completed and "timing" relay switch section 430 thereby closed, knife pulses will again be admitted to the logic, permitting the measurement and connection cycle to repeat.

As was the case with the "transfer" order described above, the measurement cycle is repeated until a "white" signal is generated. Then, not only is the sequencer bypass released, but also all of the circuit changes controlled by the "transfer" relay are restored to normal for automatic operation of the system.

In the event of a change in operating speed of the combiner and, therefore, a related change in operating speed of knives, it is a teaching of the invention that operation of sequencer 178 should be bypassed to permit prompt correction of any error which may occur in the relative speeds of the web and the knife, rather than waiting, under control of the sequencer, for an error trend to appear.

IN FIG. 10, a means is shown for generating a control signal when either acceleration, or deceleration of the combiner occurs. The control signal, operating through "acceleration-deceleration" relay 494, closes "acceleration-deceleration" relay switch contacts 496 (FIG. 9) and thus energizes "bypass" relay 394. To this end, pulses from web rider signal generator 62 are transmitted (line 66) to pulse shaper 492 and thence to integrator RC circuit 498. The output of integrator 498 is fed to storage capacitor 500 which, acting in concert with bias resistor 502 maintains a bias level at the input of operational amplifier 504. Operational amplifier 504 is of the type which, being powered with both positive and negative DC supply voltages from suitable supplies (not shown) transmits a signal from its output to the coil of "acceleration-deceleration" relay 494 whenever a change, whether positive or negative, occurs in the bias voltage level. Thus, if the operating speed of the combiner is increased, the number of pulses per second transmitted by the web rider will increase, causing an increase in the output of integrator 498. Capacitor 500 will accumulate a higher charge, increasing the bias on operational amplifier 504. Operational amplifier 504 will thus energize "acceleration-deceleration" relay coil 494. When a new equilibrium is reached in the integrating and bias circuitry, operational amplifier 504 will cease to transmit current to "acceleration-deceleration" relay 494, and relay will open, and bypass of the sequencer will cease with the first "white" signal. Similarly, if there is a decrease in the number of pulses per second received at integrator 498, there will be an effective decrease in the bias supplied to the operational amplifier and a current will again flow through the coil of relay 494 until equilibrium conditions are reestablished. It will be noted that, with each closing of "acceleration-deceleration" relay 494, "bypass" relay 394 is closed, closing the holding circuit through "bypass" relay switch contacts 412 and "white" relay switch contacts 410, as well as closing "bypass" relay switch contacts 229 in "over-under" control 174 (FIG. 7). Thus, when a "white" signal is received, "white" relay switch section 410 opens, releasing "bypass" relay 394, and reapplying sequencer 178 to trend-seeking control of "over-under" control circuitry.

FIG. 10 also shows a second circuit path terminating in "low-speed cut-off" relay coil 510, which serves to cut off operation of the control system when the speed of the web drops below a predetermined point. For example, when the end of an order has been reached, it is sometimes necessary for the operator to clear the knives and the space between the combiner and the knives of any unused cardboard or paper which remains after the last sheet has been cut. This is done so that the working space is free of unwanted paper, and so that changes may be made in the adjustment of slitter and scorer 8 (FIG. 1.) To this end, it is customary for the operator to open clutch 54 (FIG. 1) stopping the combiner, but allowing cutting knives 10 to continue in operation until all paper has been cleared away to the output side of the knives. Secondly, most combiner drive systems have an idle speed of 80 to 100 feet per minute. Below this speed operation becomes unreliable due, for instance, to play in the drive linkages and reproducable results subject to automatic control cannot be expected. Therefore, a low-speed cut-off is provided which stops sheet length measurements whenever the speed drops below a predetermined point and which, while the speed is down, prevents operation of sheet control 64 and footage control 32 by stopping the flow of knife pulses through gate 51 (FIG. 2.)

To this end, pulses from web rider signal generator 62 are fed through pulses shaper 512 into differentiator RC circuit 514 to ground. The output of differentiator 514 is fed through blocking diode 518 to capacitor 520 and to the control electrode of silicon controlled rectifier 522. Rectifier 522 is supplied with alternating current from source 524 through "low-speed cut-off" relay solenoid 510. The flow of current through relay coil 510 thus depends upon the state of charge of capacitor 520. Assuming that the circuit constants have been chosen for cut-off at speeds of below 100 feet per minute, then, when the web is being fed from combiner 6 at a rate of 100 feet a minute or more, the charge maintained on capacitor 520 is sufficient to bias silicon controlled rectifier 522 so that it conducts and maintains solenoid 510 energized. Single-pole, single-throw, "low-speed cut-off" switch section 390 (FIG. 8), is therefore maintained open and normal operation of the logic circuitry proceeds. When the web riber signal decreases in frequency, the charge stored on capacitor 520 decreases in magnitude, and, when the voltage appearing upon the control electrode of silicon control rectifier 522 drops below the cut-off point, current flow through "low-speed cut-off" relay solenoid 510 is interrupted, and "low-speed cut-off" switch section 390 closes. Referring to FIG. 8, it will be seen that the closing of "low-speed cut-off" relay switch section 390 provides a path for current flow through first binary relay coil 384 and blocking diode 388 to ground, and that this effects washout of the count operation as described above, as well as bypassing of the sequencer. A new count cycle will be started by the next knife pulse, but sequence control will not resume until "low-speed cut-off" relay switch 390 is re-opened and a "white" signal is generated.

"Low-speed cut-off" relay switch section 499 is normally open when closed, gate 51 (FIG. 2) is grounded, preventing the transmission of knife pulses to sheet counter 64. Thus, no sheets are counted while operating below the critical speed for which the low-speed cut-off is set.

What I claim is:

1. Apparatus for use in controlling the fabrication, feed, and cutting continuously produced material including cutter operated at a variable speed, a feeder for supplying material to said cutter at a selected speed, a fabricator producing the material and supplying it to said feeder at a speed which may differ from said selected speed, and a footage control responsive to a predetermined production order and to the speeds of the cutter and of the fabricator for determining the amount of material to be produced by the fabricator for the completion of an order.

2. The apparatus of claim 1 including an adder for increasing the size of the predetermined production order during operation and for reflecting the increase in the determination of the amount of material to be fabricated.

3. The apparatus of claim 2 in which operation of the adder is prevented when the fabricator is incapable of supplying the additional material required.

4. The apparatus of claim 1 in which a sheet length control, responsive to the lengths of the sheets as they are cut, varies the speed of the cutter relative to the speed of the feed to maintain the lengths of the cut sheets within a predetermined tolerance.

5. The apparaus of claim 1 in which there is a dwell space between said fabricator and said feeder for storing varying amounts of fabricated material and means for differentially determining the amount of fabricated material in storage.

6. The apparatus of claim 1 in which, when operation of the feeder drops below a predetermined speed, operation of said footage control is cut off.

7. Apparatus for use in controlling the fabrication, feed and cutting of sheet material to order including a fabricator supplying material to a feeder at a varying rate of speed, a feeder for supplying said material to a cutter at a selected speed, and a cutter operated at a speed related to the feed speed for cutting the fed material into predetermined sheet lengths, means for metering the material produced by said fabricator, means for determining the length of material remaining to be supplied by said fabricator, means for metering the material fed to said cutter, a sheet counter for determining the number of sheets remaining to be cut, an add-on counter into which a supplemental sheet count may be set, means for suspending operation of the sheet counter during operation of the add-on counter, and means responsive to the metering means for suspending operation of the length determining means until the amount of extra material required to produce the supplemental sheets has been fabricated.

8. The apptratus of claim 7 in which the operation suspending means include an accumulator for storing metered feed information and an accumulator for storing metered production information until parity is achieved between the accumulators.

9. The apparatus of claim 12 in which activity of the comparison means is terminated by the command and a new comparison and correction is made immediately upon completion of the transfer.

10. An apparatus for correcting the speed of operation of a cutter relative to the speed of flow of uncut material to the cutter including means for producing a train of pulses whose repetition rate is proportional to the flow speed, means for producing a knife speed pulse coincident with each action of the cutter, means for comparing the knife speed signal with the flow speed signal to determine whether the length of material cut between two knife pulses is shorter or longer than a predetermined length, means for generating a signal proportional to the error length, means for generating an over or under error signal, means for retaining the error signals, and means for applying the error signals to correct said knife speed prior to the arrival of a third knife pulse, means for storing a new predetermined sheet length, and means for transferring the new length into the counting means.

11. The apparatus of claim 10 including means for preventing the transmission of a third knife pulse to said comparison means until the knife speed correction has been made.

12. The apparatus of claim 11 in which direct transmission of the third knife pulse to the comparison means is restored when a sheet of the correct length has been cut.

13. The apparatus of claim 10 including means for establishing an error trend prior to correcting said knife speed, means for suspending action of the error trend establishing means when a change is made in feed speed or in the predetermined length, and means for restoring the error trend action when a sheet of the correct length has been cut.

References Cited

UNITED STATES PATENTS

| 3,181,403 | 5/1965 | Sterns et al. | 83—76 |
| 3,195,385 | 7/1965 | Paterson | 83—76 |
| 3,244,863 | 4/1966 | Paterson | 83—76 X |
| 3,267,781 | 8/1966 | Sterns et al. | 83—76 X |

JAMES M. MEISTER, *Primary Examiner.*

UNITED STATES PATENT OFFICE
CERTIFICATE OF CORRECTION

Patent No. 3,411,388　　　　　　　　　　　　　　November 19, 1968

Max Rappaport

It is certified that error appears in the above identified patent and that said Letters Patent are hereby corrected as shown below:

Column 2, line 31, cancel "of", first occurrence. Column 4, line 19, "postage" should read -- footage --. Column 5, line 60, "67" should read -- 69 --. Column 6, line 68, "conuter" should read -- counter --. Column 7, line 37, "118" should read -- 34 --. Column 8, lines 11 to 13, cancel ", when switch 61 is activated, the signal passes to stepping relay solenoid 65"; line 36, "94" should read -- 93 --; line 45, "95" should read -- 99 --; line 75, "104" should read -- 103 --. Column 9, line 24, "undistributed" should read -- undisturbed --; line 52, "count preset 88" should read -- counter preset 86 --; line 57, "88" should read -- 86 --; line 66, "occomplished" should read -- accomplished --; line 68, "88" should read -- 86 --. Column 10, line 4, "88" should read -- 86 --; line 73, "553" should read -- 533 --. Column 11, lines 29 and 30, "provided" should read -- provides --. Column 14, line 60, "errror" should read -- error --; same line 60, "operattions" should read -- operations --. Column 15, line 45, "pulses" should read -- pulser --; line 50, "pulses" should read -- pulse --. Column 19, line 44, "partity-seeking" should read -- parity-seeking --. Column 22, line 17, cancel "even". Column 24, line 4, "present" should read -- preset --. Column 25, line 6, "333" should read -- 338 --; line 20, after "by" insert -- the --. Column 27, line 17, "thet" should read -- the --. Column 28, line 46, "to", second occurrence, should read -- of --. Column 31, line 1, "apparaus" should read -- apparatus --. Column 32, line 1, "apptratus" should read -- apparatus --; line 12, claim reference numeral "12" should read -- 8 --.

Signed and sealed this 7th day of April 1970.

(SEAL)
Attest:

EDWARD M. FLETCHER, JR.　　　　　　　　　　WILLIAM E. SCHUYLER, JR.
Attesting Officer　　　　　　　　　　　　　　Commissioner of Patents